(12) United States Patent
Burger

(10) Patent No.: US 9,819,542 B2
(45) Date of Patent: Nov. 14, 2017

(54) CONFIGURING ACCELERATION COMPONENTS OVER A NETWORK

(71) Applicant: Microsoft Technology Licensing, LLC, Redmond, WA (US)

(72) Inventor: Douglas C. Burger, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 111 days.

(21) Appl. No.: 14/752,778

(22) Filed: Jun. 26, 2015

(65) Prior Publication Data

US 2016/0380819 A1   Dec. 29, 2016

(51) Int. Cl.
*H04L 12/24* (2006.01)
*G06F 11/14* (2006.01)
*G06F 11/07* (2006.01)
*G06F 11/30* (2006.01)

(52) U.S. Cl.
CPC ...... *H04L 41/0816* (2013.01); *G06F 11/0709* (2013.01); *G06F 11/0793* (2013.01); *G06F 11/1428* (2013.01); *G06F 11/3003* (2013.01)

(58) Field of Classification Search
CPC ............. H04L 41/0816; G06F 11/0709; G06F 11/0793; G06F 11/1428; G06F 11/3003
USPC ........................................................ 709/221
See application file for complete search history.

(56) References Cited

U.S. PATENT DOCUMENTS 6,326,806 B1   12/2001   Fallside et al.
6,496,971 B1   12/2002   Lesea et al.
6,573,748 B1   6/2003    Trimberger
7,382,154 B2   6/2008    Ramos et al.
7,953,014 B2   5/2011    Toda et al.
(Continued)

FOREIGN PATENT DOCUMENTS

CN   101783812 A   7/2010
CN   101545933 B   1/2012
JP   2013062566 A   4/2013

OTHER PUBLICATIONS

Kim, "Polymorphic on-chip networks", Computer Architecture, ISCA'08. 35th International Symposium on. IEEE, 2008.*

(Continued)

*Primary Examiner* — Nicholas Taylor
*Assistant Examiner* — Chong G Kim
(74) *Attorney, Agent, or Firm* — Dodd Law Group; Michael B. Dodd

(57) ABSTRACT

Aspects extend to methods, systems, and computer program products for (re)configuring acceleration components over a network. (Re)configuration can be implemented for any of a variety of reasons, including to address an error in functionality at the acceleration component or to update functionality at the acceleration component. During (re)configuration, connectivity can be maintained for any other functionality at the acceleration component untouched by the (re)configuration. Network (re)configuration of acceleration components facilitates management of acceleration components and accelerated services from a centralized service. Network (re)configuration of acceleration components also relieves host components from having to store (potentially diverse and numerous) image files.

20 Claims, 22 Drawing Sheets

(56) References Cited

U.S. PATENT DOCUMENTS

| | | | |
|---|---|---|---|
| 8,018,866 B1* | 9/2011 | Kasturi | H04L 41/5025 370/230.1 |
| 8,145,894 B1* | 3/2012 | Casselman | G06F 15/7871 713/1 |
| 8,159,259 B1 | 4/2012 | Lewis et al. | |
| 8,516,268 B2 | 8/2013 | Woodall | |
| 8,635,675 B2 | 1/2014 | Kruglick | |
| 9,483,291 B1* | 11/2016 | Chen | G06F 9/45533 |
| 2003/0033450 A1 | 2/2003 | Appleby-Alis | |
| 2006/0015866 A1 | 1/2006 | Ang et al. | |
| 2008/0164907 A1* | 7/2008 | Mercaldi-Kim | H03K 19/177 326/41 |
| 2009/0187733 A1 | 7/2009 | El-Ghazawi | |
| 2009/0278564 A1* | 11/2009 | Dehon | G06F 17/5031 326/9 |
| 2011/0078284 A1 | 3/2011 | Bomel et al. | |
| 2012/0260078 A1 | 10/2012 | Varnum et al. | |
| 2012/0324068 A1 | 12/2012 | Jayamohan et al. | |
| 2013/0055240 A1 | 2/2013 | Gondi | |
| 2013/0314559 A1 | 11/2013 | Kim | |
| 2014/0055467 A1 | 2/2014 | Bittner et al. | |
| 2014/0282506 A1 | 9/2014 | Cadigan et al. | |

OTHER PUBLICATIONS

Tan, "A case for FAME: FPGA architecture model execution", ACM SIGARCH Computer Architecture News 38.3: 290-301, 2010.*

Madhavapeddy, "Reconfigurable data processing for clouds." Field-Programmable Custom Computing Machines (FCCM), 2011 IEEE 19th Annual International Symposium on, IEEE, 2011.*

Papadimitriou, "Performance of partial reconfiguration in FPGA systems: A survey and a cost model", ACM Transactions on Reconfigurable Technology and Systems (TRETS) 4.4 (2011): 36, 2011.*

Caulfield, "A cloud-scale acceleration architecture", Microarchitecture (MICRO), 2016 49th Annual IEEE/ACM International Symposium on. IEEE, 2016.*

Chen, et al., "Enabling FPGAs in the Cloud", In Proceedings of the 11th ACM Conference on Computing Frontiers, May 20, 2014, 10 pages.

Putnam, et al., "A Reconfigurable Fabric for Accelerating Large-Scale Datacenter Services", In Proceedings of ACM/IEEE 41st International Symposium on Computer Architecture, Jun. 14, 2014, 12 pages.

Mershad, et al., "A Framework for Multi-cloud Cooperation with Hardware Reconfiguration Support", In Proceedings of IEEE Ninth World Congress on Services, Jun. 28, 2013, pp. 52-59.

Mesquita, et al., "Remote and Partial Reconfiguration of Fpgas: Tools and Trends", In Proceedings of International Parallel and Distributed Processing Symposium, Apr. 22, 2003, 8 pages.

Madhavapeddy, et al., "Reconfigurable Data Processing for Clouds", In Proceedings of IEEE 19th Annual International Symposium on Field-Programmable Custom Computing Machines, Jun. 1, 2011, pp. 141-145.

"International Search Report and Written Opinion Issued in PCT Application No. PCT/US2016/038841", dated Sep. 28, 2016, 18 pages.

* cited by examiner

CONFIGURING ACCELERATION COMPONENTS OVER A NETWORK

CROSS-REFERENCE TO RELATED APPLICATIONS

Not Applicable

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments. For example, distributed applications can have components at a number of different computer systems.

BRIEF SUMMARY

Examples extend to methods, systems, and computer program products for configuring acceleration components over a network. An image file (e.g., an FPGA programming bitstream) is received over a network through a network interface at an acceleration component (e.g., a hardware accelerator, such as, a Field Programmable Gate Array (FPGA)). The image file is sent from another component connected to the network and is for configuring the acceleration component with a role (i.e., with programmed functionality). The acceleration component is configured in accordance with the image file by processing the image file at the acceleration component to configure the acceleration component with the role.

The network interface is maintained as stable and operational during image file processing at the acceleration component. The network interface routes network traffic between the acceleration component and at least one other hardware component during image file processing. The acceleration component utilizes the role to participate in accelerating a service after configuration is complete. Any other roles at the acceleration component can also be maintained as stable and operation during image file processing at the acceleration component. The other roles can use the network interface to transfer network traffic during image file processing.

In one aspect, an acceleration component has a role used by a group of interoperating acceleration components that provide acceleration for a service. Roles at each acceleration component in the group of interoperating acceleration components are linked together to compose a graph that provides the service acceleration. The acceleration component can have other roles in addition to the role. The group of interoperating acceleration components and one or more other acceleration components are part of a hardware acceleration plane that includes a larger plurality of acceleration components providing a configurable fabric of acceleration components for accelerating services.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features and advantages will become more fully apparent from the following description and appended claims, or may be learned by practice as set forth hereinafter.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only some implementations and are not therefore to be considered to be limiting of its scope, implementations will be described and explained with additional specificity and detail through the use of the accompanying drawings in which.

DETAILED DESCRIPTION

Figure 1:
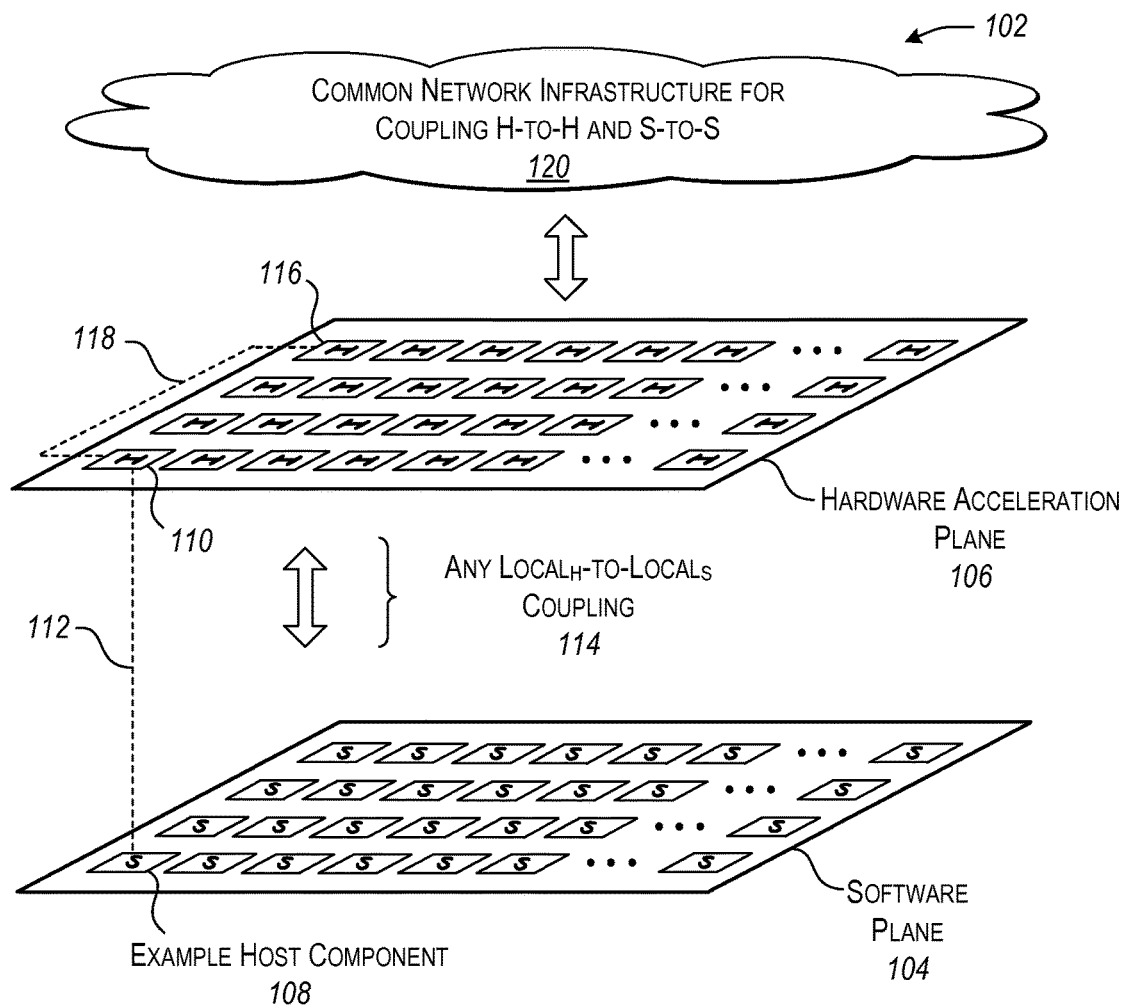
FIG. 1 illustrates an example architecture that includes a software plane and a hardware acceleration plane.

Examples extend to methods, systems, and computer program products for configuring acceleration components over a network. An image file (e.g., an FPGA programming bitstream) is received over a network through a network interface at an acceleration component (e.g., a hardware accelerator, such as, a Field Programmable Gate Array (FPGA)). The image file is sent from another component connected to the network and is for configuring the acceleration component with a role (i.e., with programmed functionality). The acceleration component is configured in accordance with the image file by processing the image file at the acceleration component to configure the acceleration component with the role.

The network interface is maintained as stable and operational during image file processing at the acceleration component. The network interface routes network traffic between the acceleration component and at least one other hardware component during image file processing. The network interface can also route network traffic from the a network to a host (and from the host to the network), independent of the acceleration component. The acceleration component utilizes the role to participate in accelerating a service after configuration is complete. Any other roles at the acceleration component can also be maintained as stable and operation during image file processing at the acceleration component. The other roles can use the network interface to transfer network traffic during image file processing.

Implementations may comprise or utilize a special purpose or general-purpose computer including computer hardware, such as, for example, one or more processors and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multi-processor systems, microprocessor-based or programmable consumer electronics, network PCs, minicomputers, mainframe computers, mobile telephones, PDAs, tablets, pagers, watches, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

A cloud computing environment includes first-party services (e.g., search engines) running in a datacenter.

In this description and the following claims, an "acceleration component" is defined as a hardware component specialized (e.g., configured, possibly through programming) to perform a computing function more efficiently than software running on general-purpose central processing unit (CPU) could perform the computing function. Acceleration components include Field Programmable Gate Arrays (FPGAs), Graphics Processing Units (GPUs), Application Specific Integrated Circuits (ASICs), Erasable and/or Complex programmable logic devices (PLDs), Programmable Array Logic (PAL) devices, Generic Array Logic (GAL) devices, and massively parallel processor array (MPPA) devices.

In this description and in the following claims, a "role" is defined as functionality provided by an acceleration component to a group of interoperating acceleration components used to accelerate a service. Roles at each acceleration component in a group of interoperating acceleration components can be linked together to compose a graph that provides the service acceleration.

In this description and in the following claims, a "graph" is defined as a group of one or more interconnected (e.g., network connected) acceleration components providing acceleration for a service wherein each acceleration component in the group provides a portion of the acceleration functionality.

In this description an in the following claims, an "image" is defined as a file including information that can be used in configuration of an acceleration component, such as, for example, an FPGA. Information included in an image file can be used to program hardware components of an acceleration component (e.g., logic blocks and reconfigurable interconnects of an FPGA) to implement desired functionality. Desired functionality can be implemented to solve virtually any problem which is computable. An image can be an FPGA programming bitstream.

In this description and in the following claims, a "neighbor acceleration component" is defined as an acceleration component configured to exchange input and/or output with another acceleration component when interconnected to the other acceleration component within a graph. Neighbor is viewed logically from the perspective of the graph. The physical proximity of an acceleration component relative to another acceleration component is not a determining factor in identifying neighbor acceleration components. That is, acceleration components that are not physically adjacent to one another (or even near to one another on a network or within a datacenter) can be configured to exchange data with one another when interconnected within a graph. Acceleration components interconnected within a graph can be viewed as neighbor acceleration components even if data exchanged between the acceleration components physically passes through other acceleration components outside of the graph or through host components in transit between the acceleration components. However, acceleration components that are physically adjacent or near to one another on a network or in a datacenter and are interconnected within a graph can also be viewed as neighbor acceleration components with respect to one another.

In general, an acceleration component can include an array of programmable logic blocks and hierarchy of reconfigurable interconnects that allow logic blocks to be connected together in different configurations to provide different functionality (i.e., different roles). Image files can be received and loaded at an acceleration component to configure programmable logic blocks and configure interconnects to provide desired functionality (i.e., roles).

In some environments, applications (services) are provided to a client from a data center. A data center includes multiple (and potentially a very large number of) software-driven general purpose computing devices. Each general purpose computing device can include one or more central processing units (CPUs) that process machine-readable instructions to perform specified computing activities. The multiple general purpose computing devices are networked to one another such that the combined power of the multiple general purpose computer systems (or subsets thereof) can be used to perform more complex computing activities.

Data center providers face continuing challenges to increase processing capabilities and efficiency within and provided by data centers. Continuing to add more and more general purpose computing devices is less cost effective due at least in part to power limitations. Non-programmable computing device specialization is one option. For example, computing devices can be specialized for specific scale workloads to provide some efficiency gains. However, computing device specialization is problematic for at least two reasons. First, lack of homogeneity in a data center increases management issues and provides inconsistent platforms for applications to rely on. Further, data center services evolve rapidly, making non-programmable hardware features impractical. Thus, data center providers need continued improvements in performance and efficiency but cannot obtain enough improvement from general purpose computing devices.

Aspects facilitate (re)configuring an acceleration component over a network. An acceleration component can be (re)configured using an image received over a network. The image can be received at the acceleration component through a network interface programmed into the acceleration component. In one aspect, an acceleration component is (re)configured over a network without a locally linked host component having knowledge of the (re)configuration. In another aspect, a locally linked host requests an image from a remote service.

(Re)configuring acceleration components over a network enables a centralized service to manage accelerated services in a datacenter without requiring changes to locally linked hosts. (Re)configuring acceleration components over a network also relieves locally linked hosts from having to maintain and/or store image files.

In some aspects, an acceleration component is partially reconfigured. During an initial configuration, a network interface (possibly along with one or more roles) is installed at the acceleration component. The network interface is hardened such that acceleration component resources (e.g., logic blocks and interconnects) allocated for the network interface are not impacted by (re)configuration of roles at the acceleration component. Thus, the network interface can be maintained as stable and operation during processing of images files to (re)configure roles at the acceleration component. For example, the network interface can route network traffic between the acceleration component and at least one other hardware component during image file processing at the acceleration component.

Over time, reasons for reconfiguring roles at the acceleration component can develop. For example, a role at the acceleration component may exhibit errors, a role at another acceleration component may exhibit errors (necessitating repurposing of the acceleration component), a changing need for services can be detected (increase capacity of one service by decreasing capacity of another service to make room), there may be an update available for a role, a higher level service may determine that a different role is to be installed at the acceleration component, etc. As such, an image file for a role can be sent over a network to an acceleration component. The image file can be received through a network interface at the acceleration component.

In one aspect, a received image file is stored at a storage component, such as, for example, flash memory, associated with the acceleration component. The image file is then processed from the storage component to configure the acceleration component in accordance with the image file. For example, an image loader can write the image file from the storage component to resources (e.g., logic blocks and interconnects) of an acceleration component to configure a role at the acceleration component. In another aspect, an image file received over a network is written directly to the resources (e.g., logic blocks and interconnects) of an acceleration component (potentially as is it is streamed to the acceleration component) to configure a role at the acceleration component.

In some aspects, an acceleration component provides a role to a group of interoperating acceleration components that provide acceleration of a service. Roles at each acceleration component in the group of interoperating acceleration components are linked together to compose a graph that provides the service acceleration. The acceleration component can also have other functionality in addition to the role.

For example, in one aspect, an acceleration component provides roles to a plurality of groups of interoperating acceleration components linked together to compose graphs that provide acceleration for a plurality of corresponding services. During reconfiguration of a role for one group of interoperating acceleration components, roles for any other groups of interoperating acceleration components can be maintained as stable and operational. Thus, during reconfiguration of one role at acceleration component, any of the other roles at the acceleration component can continue to use the network interface to route network traffic between the acceleration component and other components.

In a further aspect, acceleration components are locally linked to host components (e.g., CPUs). In these further, aspects host components can maintain a subset of image files in local storage. The host component can transfer image files to a locally linked acceleration component over a local link (e.g., Peripheral Component Interconnect Express (PCIe), Universal Serial Bus (USB), etc.). As such, acceleration components can be configured using image files received over a network and/or image files received over local links. To initiate network transfer of a remote image file to an acceleration component, a locally linked host component can expressly request that the remote image file (i.e., an image file stored at a network location) be sent to the acceleration component. A host component can also opt out of network configuration for any locally linked acceleration components. The host component can use image files in local storage to configure acceleration components.

An acceleration component or locally linked host can include a security mechanism to verify a bit stream including an image file. The security mechanism can provide some assurance that an image file is being received from a legitimate network source.

In general, a data center deployment includes a hardware acceleration plane and a software plane. The hardware acceleration plane can include a plurality of networked acceleration components (e.g., FPGAs). The software plane can include a plurality of networked software-implemented host components (e.g., central processing units (CPUs)). A network infrastructure can be shared between the hardware acceleration plane and the software plane. As described, software-implemented host components can be locally linked to corresponding acceleration components.

FIG. 1 illustrates an example architecture 102 that includes a software plane 104 and a hardware acceleration plane 106. The software plane 104 includes a collection of software-driven components (each denoted by the symbol "S") while the hardware plane includes a collection of hardware acceleration components (each denoted by the symbol "H"). For example, each host component may correspond to a server computer that executes machine-readable instructions using one or more central processing units (CPUs). Each CPU, in turn, may execute the instructions on one or more hardware threads. Each acceleration component can execute hardware logic for implementing functions, such as, for example, portions of services offer by a data center.

Hardware acceleration plane 106 can be constructed using a heterogeneous collection of acceleration components, including different types of acceleration components and/or the same type of acceleration components with different capabilities. For example, hardware acceleration plane 106 can include FPGA devices having different respective processing capabilities and architectures, a mixture of FPGA devices and other devices, and so on. Hardware acceleration plane 106 provides a reconfigurable fabric of acceleration components.

A host component generally performs operations using a temporal execution paradigm (i.e., sequentially) by using each of its CPU hardware threads to execute machine-readable instructions, one after the after. In contrast, an acceleration component may perform operations using a spatial paradigm (i.e., concurrently) by using a large number of parallel logic elements to perform computational tasks. Thus, an acceleration component can perform some operations in less time compared to a software-driven host component. In the context of the architecture 102, the "acceleration" qualifier associated with the term "acceleration component" reflects its potential for accelerating the functions that are performed by the host components.

In one example, architecture 102 corresponds to a data center environment that includes a plurality of computer servers. The computer servers correspond to the host components in the software plane 104. In another example, architecture 102 corresponds to an enterprise system. In a further example, the architecture 102 corresponds to a user device or appliance which uses at least one host component that has access to two or more acceleration components, etc. Other implementations for architecture 102 are also possible.

Common network infrastructure 120 couples host components in the software plane 104 to other host components and couples acceleration components in the hardware acceleration plane 106 to other acceleration components. That is, host components can use common network infrastructure 120 to interact with one another and acceleration components can use common network infrastructure 120 to interact with one another. Interaction among host components in the software plane 104 is independent of the interaction among acceleration components in the hardware acceleration plane 106. As such, two or more acceleration components may communicate in a transparent manner relative to host components in the software plane 104, outside the direction of the host components, and without the host components being "aware" of particular interaction is even taking place in the hardware acceleration plane 106.

Architecture 102 can use any of a variety of different protocols to facilitate communication between acceleration components over network infrastructure 120 and can use any of a variety of different protocols to facilitate communication between host components over network infrastructure 120. For example, architecture 102 can uses Ethernet protocol to transmit Internet Protocol (IP) packets over network infrastructure 120. In one implementation, each local host component in a server is given a single physical IP address. The local acceleration component in the same server may adopt the same IP address. The server can determine whether an incoming packet is destined for the local host component or destined for the local acceleration component in different ways. For example, packets that are destined for the local acceleration component can be formulated as UDP packets having a specific port; host-defined packets, on the other hand, may not be formulated in this way. In another example, packets belonging to the acceleration plane 106 can be distinguished from packets belonging to the software plane 104 based on the value of a status flag in each of the packets.

As such, architecture 102 can be viewed as two logical networks (software plane 104 and hardware acceleration plane 106) that share the same physical network communication links. Packets associated with the two logical networks may be distinguished from each other by their respective traffic classes In another aspect, each host component in the architecture 102 is coupled to at least one acceleration component in hardware acceleration plane 104 through a local link. For example, a host component and acceleration component can be arranged together and maintained as single serviceable unit (e.g., a server) within architecture 102. In this arrangement, the server can be referred to as the "local" host component to distinguish it from other host components that are associated with other servers. Similarly, acceleration component(s) of a server can be referred to as the "local" acceleration component(s) to distinguish them from other acceleration components that are associated with other servers.

As depicted in architecture 102, host component 108 is coupled to acceleration component 110 through a local link 112 (e.g., a PCIe link). Thus, host component 108 is a local host component form the perspective of acceleration component 110 and acceleration component 110 is a local acceleration component from the perspective of host component 108. The local linking of host component 108 and acceleration component 110 can form part of a server. More generally, host components in software plane 104 can be locally coupled to acceleration components in hardware acceleration plane 106 through many individual links collectively represented as a local$_H$-to-local$_S$ coupling 114.

Thus, a host component can interact directly with any locally linked acceleration components. As such, a host component can initiate communication to a locally linked acceleration component to cause further communication among multiple acceleration components. For example, a host component can issue a request for a service (or portion thereof) where functionality for the service (or portion thereof) is composed across a group of one or more acceleration components in hardware acceleration plane 106.

Thus, a host component can also interact indirectly with other acceleration components in hardware acceleration plane 106 to which the host component is not locally linked. For example, host component 108 can indirectly communicate with acceleration component 116 via acceleration component 110. More specifically, acceleration component 110 communicates with acceleration component 116 via a link 118 (e.g., network infrastructure 120).

Acceleration components in hardware acceleration plane 106 can be used to accelerate larger-scale services robustly in a data center. Substantial portions of complex datacenter services can be mapped to acceleration components (e.g., FPGAs) by using low latency interconnects for computations spanning multiple acceleration components. Acceleration components can also be reconfigured as appropriate to provide different service functionality at different times.

Figure 2:
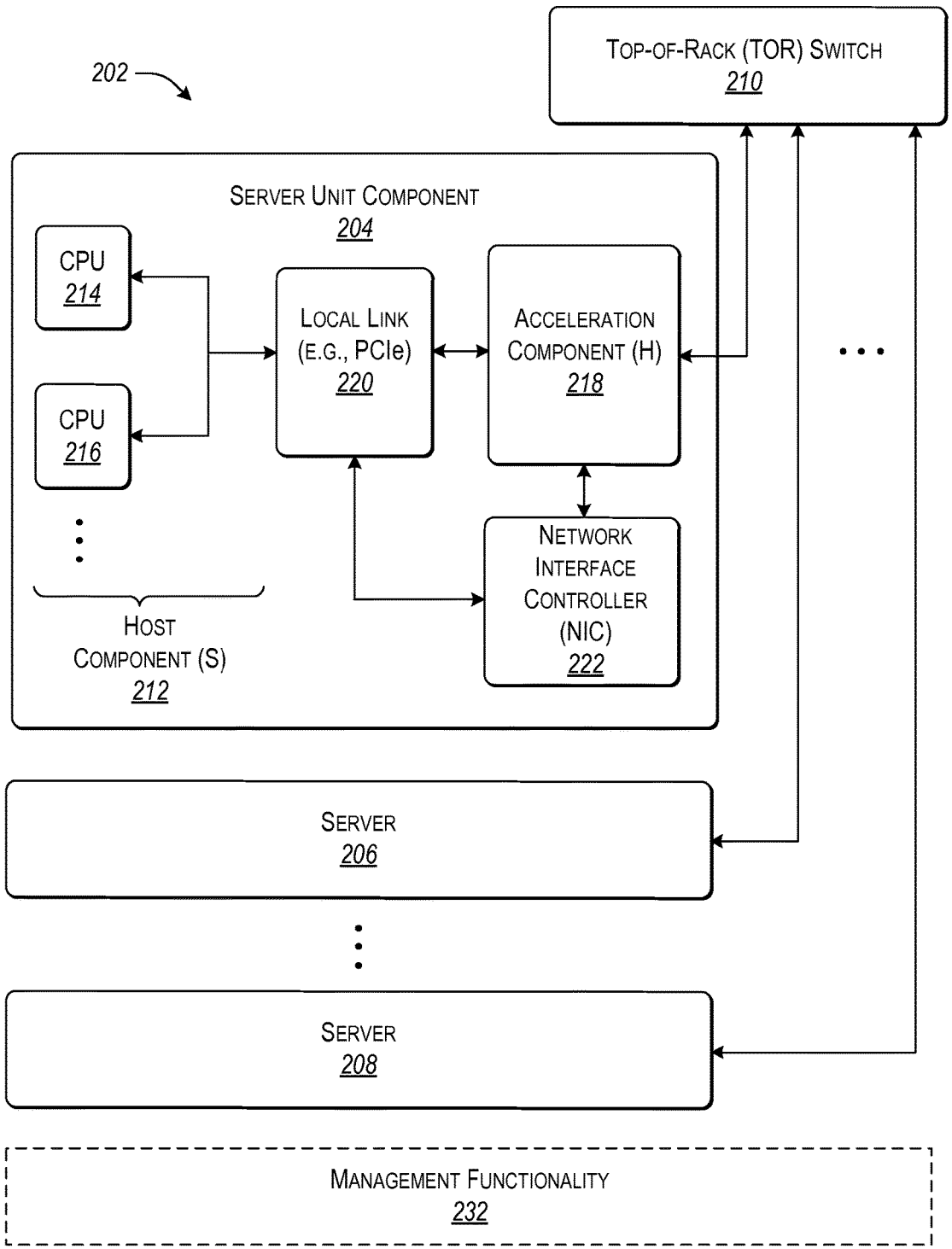
FIG. 2 illustrates an example architecture, including servers, that can be used in a data center

FIG. 2 illustrates an example architecture 202 that can be used in a data center. Servers 204, 206, and 208 can be included in a rack in the data center. Each of servers 204, 206, and 208 can be coupled to top-of-rack (TOR) switch 210. Other racks, although not shown, may have a similar configuration. Server 204 further includes host component 212 including CPUs 214, 216, etc. Host component 212 along with host components from servers 206 and 208 can be included in software plane 104. Server 204 also includes acceleration component 218. Acceleration component 218 along with acceleration components from servers 206 and 208 can be included in hardware acceleration plane 106.

Acceleration component 218 is directly coupled to host component 212 via local link 220 (e.g., a PCIe link). Thus, host component 212 can view acceleration component 218 as a local acceleration component and acceleration component 218 can view host component 212 as a local host component. Acceleration component 218 and host component 212 are also indirectly coupled by way of network interface controller 222 (e.g., used to communicate across network infrastructure 120). Server 204 can load images representing service functionality onto acceleration component 218.

Acceleration component 218 is also coupled to TOR switch 210. Hence, in architecture 202, acceleration component 218 represents the path through which host component 212 interacts with other components in the data center (including other host components and other acceleration components). Architecture 202 allows acceleration component 218 to perform processing on packets that are received from (and/or sent to) TOR switch 210 (e.g., by performing encryption, compression, etc.), without burdening the CPU-based operations performed by host component 212.

Management functionality 232 serves to manage the operations of architecture 202. Management functionality 232 can be physically implemented using different control architectures. For example, in one control architecture, the management functionality 232 may include plural local management components that are coupled to one or more global management components.

Figure 3:
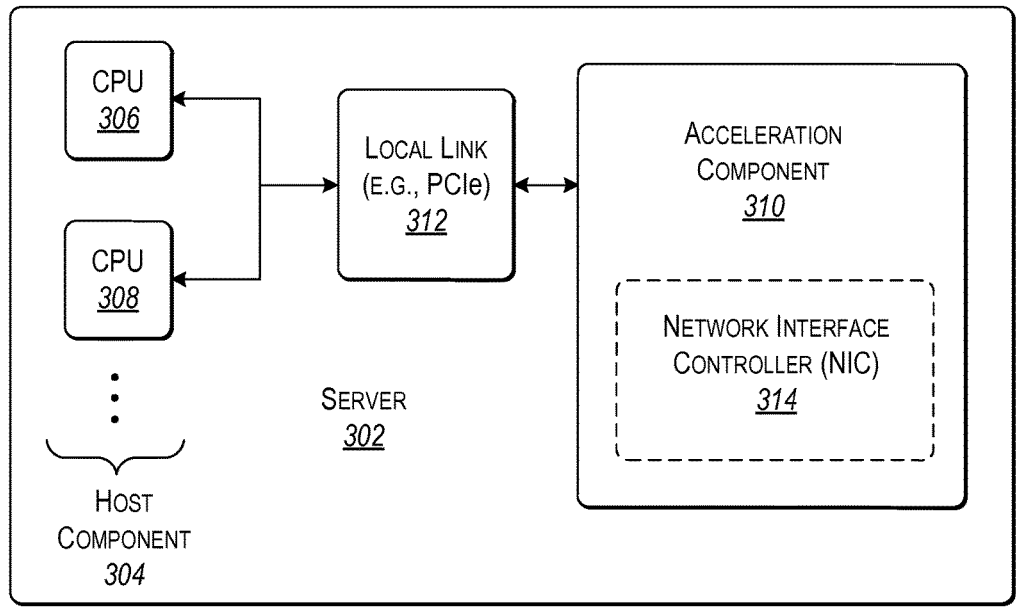
FIG. 3 illustrates an example server.

FIG. 3 illustrates an example server 302. Server 302 includes host component 304 including CPUs 306, 308, etc., acceleration component 310, and local link 312. Acceleration component 310 is directly coupled to host component 304 via local link 312 (e.g., a PCIe link). Thus, host component 304 can view acceleration component 310 as a local acceleration component and acceleration component 310 can view host component 304 as a local host component. Host component 304 and acceleration component 310 can be included in software plane 104 and hardware acceleration plane 106 respectively. Server 302 implements network interface controller (NIC) 314 as an internal component of acceleration component 310. Server 302 can load images representing service functionality onto acceleration component 310.

Figure 4:
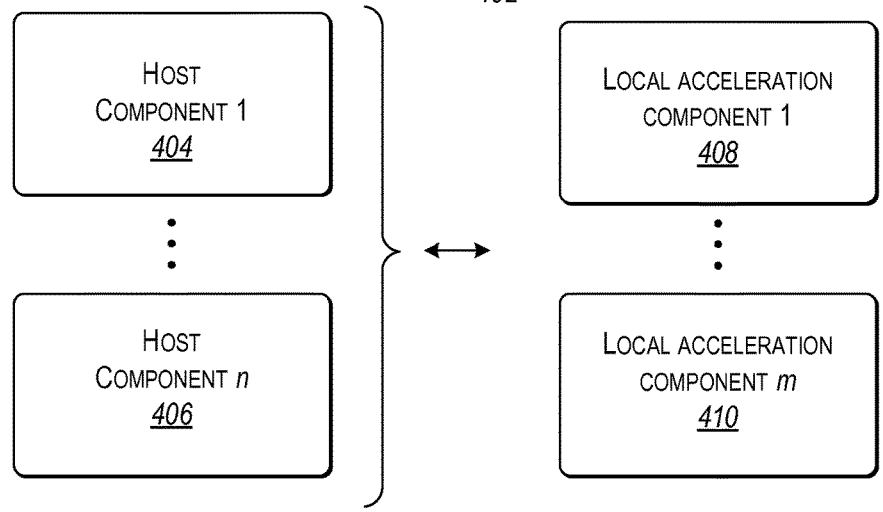
FIG. 4 illustrates an example server.

FIG. 4 illustrates an example server 402. Server 402 includes host components 404 through 406 including any number n of host components. Host components 404 through 406 can be included in software plane 104. Server 402 includes acceleration components 408 through 410 including any number m of acceleration components. Acceleration components 408 through 410 can be included in hardware acceleration plane 106. Server 402 can also include a network interface controller (not shown).

Server 402 can include a single host component locally linked to two acceleration components. The two acceleration components can perform different respective tasks. For example, one acceleration component can be used to process outgoing traffic to its local TOR switch, while the other acceleration component can be used to process incoming traffic from the TOR switch. In addition, server 402 can load images representing service functionality onto any of the acceleration components 408 through 410.

In general, a service (e.g., document ranking, encryption, compression, computer vision, speech translation, etc.) can be implemented at one or more host components, at one or more acceleration components, or a combination of one or more host components and one or more acceleration components depending on what components are better suited to provide different portions of the service.

Figure 5:
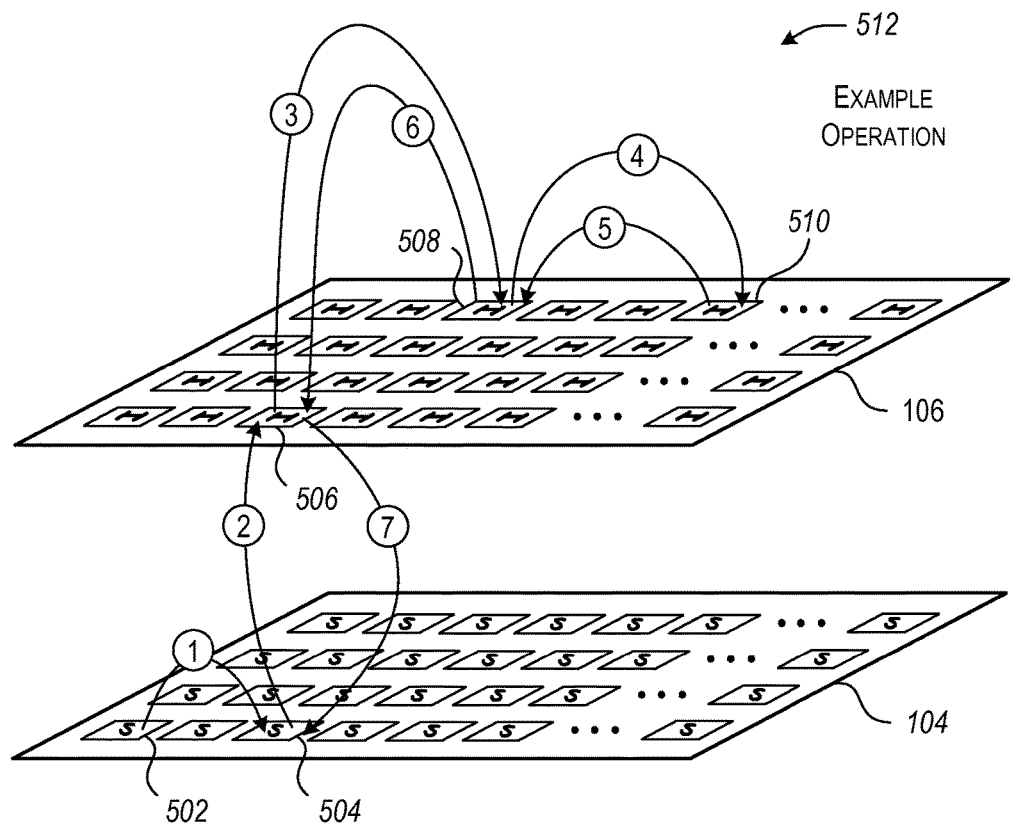
FIG. 5 illustrates an example service implemented using components of a software plane and components of a hardware acceleration plane.

FIG. 5 illustrates an example service 512 implemented using components of software plane 104 and components of hardware acceleration plane 106. In operation (1), host component 502 communicates with host component 504 in the course of performing a computational task. In operation (2) host component 504 then requests the use of service 512 that is implemented in the hardware acceleration plane 106 (although host component 504 may not be "aware" of where service 512 is implemented) by communicating with acceleration component 506 over a local link.

The requested service 512 is a composed service spread out over a plurality of acceleration components, each of which performs a specified portion of the service. Although acceleration component 506 was contacted to request use of the service 512, acceleration component 506 may not be the head of the composed service (or even be part of the multi-component service). Instead, acceleration component 508 may be the head component for the composed service.

As such, in operation (3), host component 504 indirectly communicates with acceleration component 508 via acceleration component 506. Acceleration component 508 then performs its portion of the composed service to generate an intermediate output result. In operation (4), acceleration component 508 then invokes acceleration component 510, which performs another respective portion of the composed service, to generate a final result. In operations (5), (6), and (7), the hardware acceleration plane 106 successively forwards the final result back to the requesting host component 504, through the same chain of components set forth above but in the opposite direction.

Operations in hardware acceleration plane 106 are performed in an independent manner of operations performed in the software plane 104. In other words, the host components in the software plane 104 do not manage the operations in the hardware acceleration plane 106. However, the host components may invoke the operations in the hardware acceleration plane 106 by issuing requests for services that are hosted by the hardware acceleration plane 106.

The hardware acceleration plane 106 operates in a manner that is transparent to a requesting host component. For example, host component 504 may be "unaware" of how its request is being processed in hardware acceleration plane 106, including the fact that the service corresponds to a composed service.

Communication in software plane 104 (e.g., corresponding to operation (1)) can take place using the same common network infrastructure 120 as communication in the hardware acceleration plane 106 (e.g., correspond to operations (3)-(6)). Operations (2) and (7) may take place over a local link, corresponding to the $local_H$-to-$local_S$ coupling 114 shown in FIG. 1.

Figure 6:
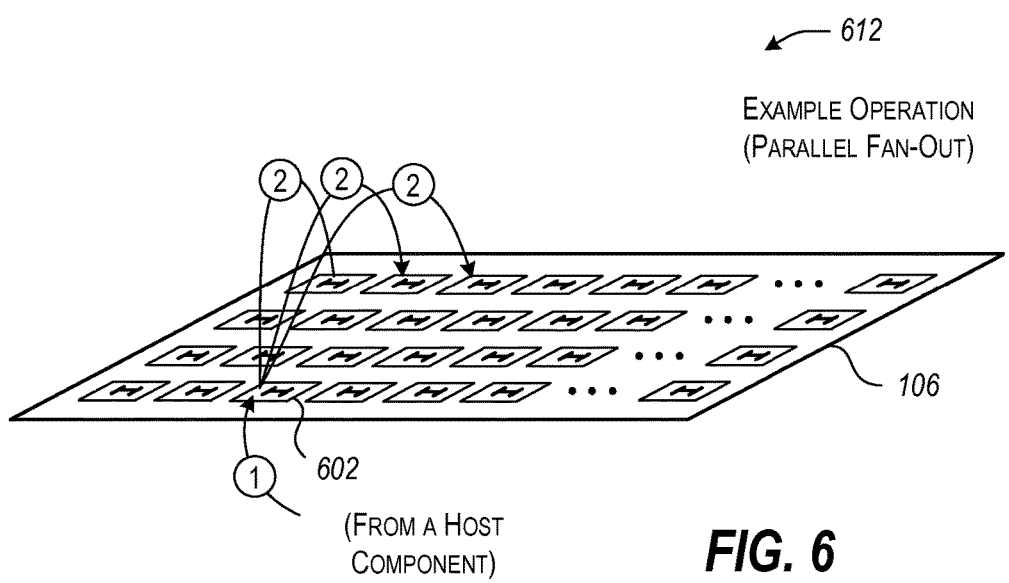
FIG. 6 illustrates an example service implemented using components of a software plane and components of a hardware acceleration plane.

FIG. 6 illustrates an example service 612 implemented using components of a software plane and components of hardware acceleration plane 106 Service 612 uses a different flow structure than service 512. More specifically, in operation (1), a host component (not shown) sends a request to its local acceleration component 602. In this example, local acceleration component 602 is also the head component of service 612. In operation (2), local acceleration component 602 may then forward one or more messages to a plurality of respective acceleration components. Each acceleration component that receives a message may perform a portion of a composed service in parallel with the other acceleration components. (FIG. 6 may represent only a portion of service 612, other portions of service 612 can be implemented at other hardware accelerators).

In general, an acceleration component can include any of variety of components some of which can be more or less common across different application images. Some components, such as, for example, a role, are distinct between application images. Other components, such as, for example, routers, transport components, switches, diagnostic recorders, etc., can be relatively common between some number of application images. These other relatively common components can be viewed as being included in an intermediate layer of abstraction or "soft shell". Further components, such as, for example, bridges, bypass controls, Network Interface Cards, Top of Rack Interfaces, buffers, memory controllers, PCIe controllers, Inter-FPGA network controllers, configuration memories and interfaces, host interfaces, debugging and back-channel interfaces (e.g., Joint Test Action Group (JTAG) interfaces, Inter-Integrated Circuit (I2C) interfaces, etc.), sensors, etc. can be very common between a higher number of (and essentially all) application images. These further very common components can be viewed as included in a greater layer of abstraction (e.g., than the other relatively common components) or "shell".

When an FPGA is reconfigured with new functionality, it is likely (although not guaranteed) that a role (i.e., the application-specific logic) at the FGPA is changed. However, it is unlikely that existing functionality in the soft shell is changed and it is extremely unlikely that existing functionality in the soft shell is changed. Thus, components in the soft shell and to greater extent components in the shell provide a common interface for a role. As such, the shell allows code for a role to be ported relatively easy across different acceleration components.

Figure 7:
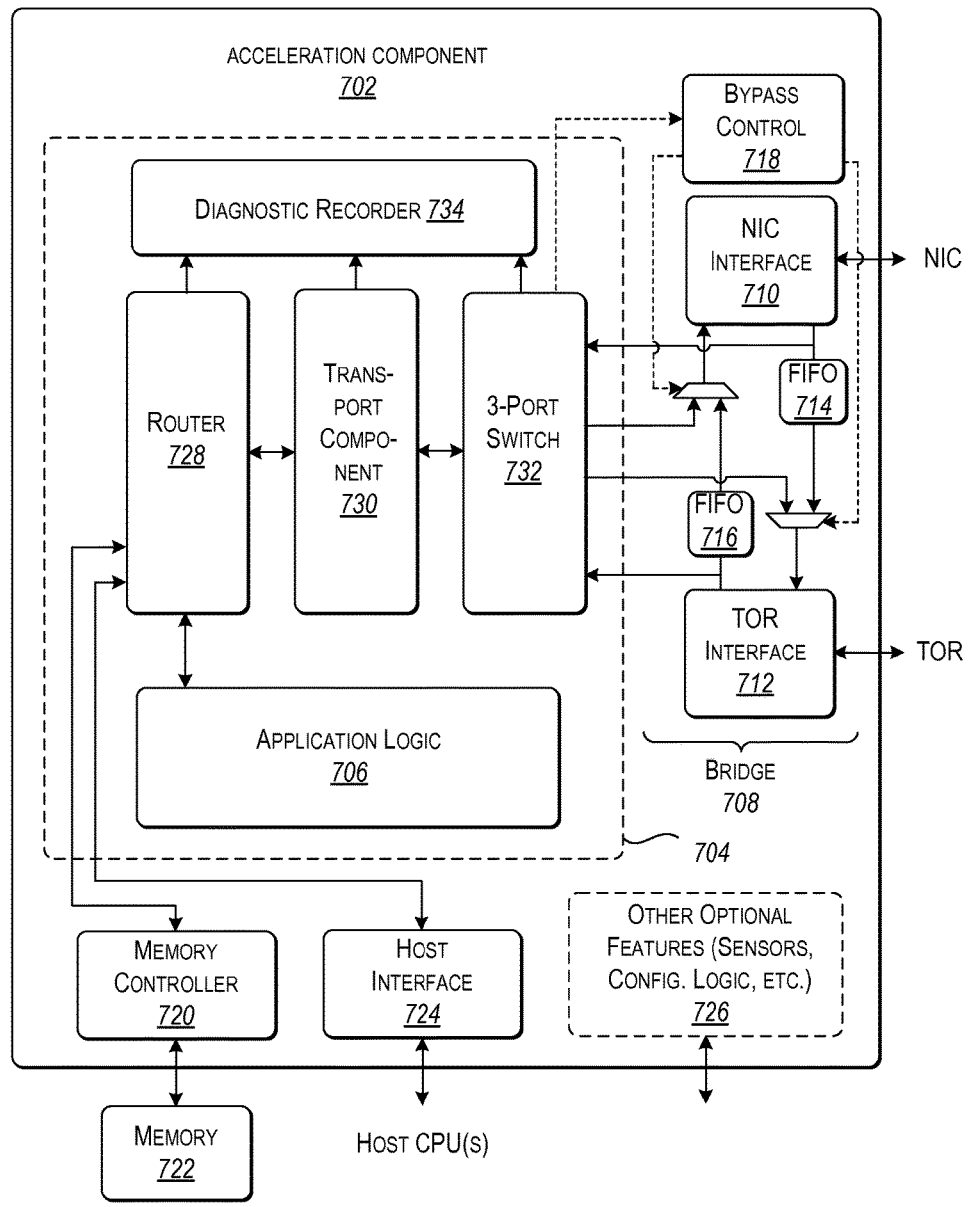
FIG. 7 illustrates an example architecture of an acceleration component.

Turning to FIG. 7, FIG. 7 illustrates an example architecture of an acceleration component 702. Acceleration component 702 can be included in hardware acceleration plane 106. Components included in acceleration component 702 can be implemented on hardware resources (e.g., logic blocks and programmable interconnects) of acceleration component 702.

Acceleration component 702 includes application logic 706, soft shell 704 associated with a first set of resources and shell 711 associated with a second set of resources. The resources associated with shell 711 correspond to lower-level interface-related components that generally remain the same across many different application scenarios. The resources associated with soft shell 704 can remain the same across at least some different application scenarios. Application logic 706 may be further conceptualized as including an application domain (e.g., a "role"). The application domain or role can represent a portion of functionality included in a composed service spread out over a plurality of acceleration components.

The application domain hosts application logic 706 that performs service specific tasks (such as a portion of functionality for ranking documents, encrypting data, compressing data, facilitating computer vision, facilitating speech translation, machine learning, etc.). Resources associated with soft shell 704 are generally less subject to change compared to the application resources, and the resources associated with shell 711 are less subject to change compared to the resources associated with soft shell 704 (although it is possible to change (reconfigure) any component of acceleration component 702).

In operation, application logic 706 interacts with the shell resources and soft shell resources in a manner analogous to the way a software-implemented application interacts with its underlying operating system resources. From an application development standpoint, the use of common shell resources and soft shell resources frees a developer from having to recreate these common components for each service.

Referring first to shell 711, shell resources include bridge 708 for coupling acceleration component 702 to the network interface controller (via a NIC interface 710) and a local top-of-rack switch (via a TOR interface 712). Bridge 708 also includes a data path that allows traffic from the NIC or TOR to flow into acceleration component 702, and traffic from the acceleration component 702 to flow out to the NIC or TOR. Internally, bridge 708 may be composed of various FIFOs (714, 716) which buffer received packets, and various selectors and arbitration logic which route packets to their desired destinations. A bypass control component 718, when activated, can control bridge 708 so that packets are transmitted between the NIC and TOR without further processing by the acceleration component 702.

Memory controller 720 governs interaction between the acceleration component 702 and local memory 722 (such as DRAM memory). The memory controller 720 may perform error correction as part of its services.

Host interface 724 provides functionality that enables acceleration component 702 to interact with a local host component (not shown). In one implementation, the host interface 724 may use Peripheral Component Interconnect Express (PCIe), in conjunction with direct memory access (DMA), to exchange information with the local host component. The outer shell may also include various other features 726, such as clock signal generators, status LEDs, error correction functionality, and so on.

Turning to soft shell 704, router 728 is for routing messages between various internal components of the acceleration component 702, and between the acceleration component and external entities (e.g., via a transport component 730). Each such endpoint is associated with a respective port. For example, router 728 is coupled to memory controller 720, host interface 724, application logic 706, and transport component 730.

Transport component 730 formulates packets for transmission to remote entities (such as other acceleration components), and receives packets from the remote entities (such as other acceleration components). A 3-port switch 732, when activated, takes over the function of the bridge 708 by routing packets between the NIC and TOR, and between the NIC or TOR and a local port associated with the acceleration component 702.

Diagnostic recorder 734 can store information regarding operations performed by the router 728, transport component 730, and 3-port switch 732 in a circular buffer. For example, the information may include data about a packet's origin and destination IP addresses, host-specific data, timestamps, etc. A technician may study a log of the information in an attempt to diagnose causes of failure or sub-optimal performance in the acceleration component 702.

A plurality of acceleration components similar to acceleration component 702 can be included in hardware acceleration plane 106.

Acceleration components can use different network topologies (instead of using common network infrastructure 120 for communication) to communicate with one another. In one aspect, acceleration components are connected directly to one another, such as, for example, in a two dimensional torus.

Figure 8:
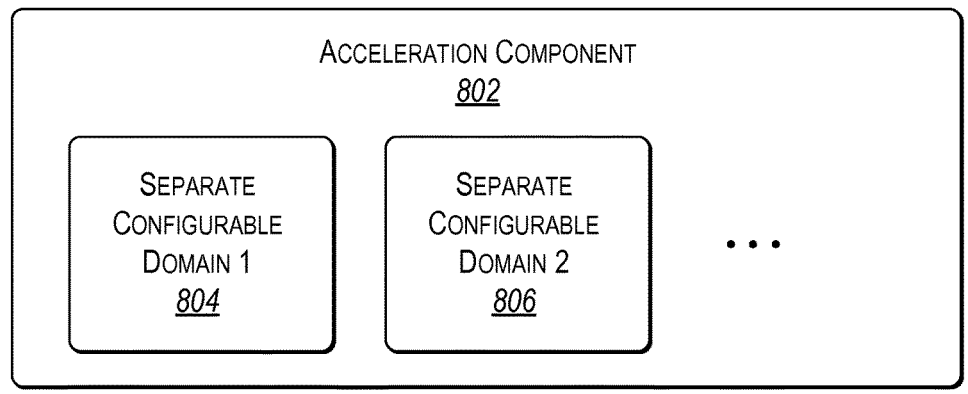
FIG. 8 illustrates an acceleration component including separate configurable domains.

FIG. 8 illustrates an acceleration component 802 including separate configurable domains 804, 806, etc. A configuration component (not shown) can configure each configurable domain without affecting other configurable domains. Hence, the configuration component can configure one or more configurable domains while the other configurable domains are executing operations based on their respective configurations, which are not disturbed.

Figure 9:
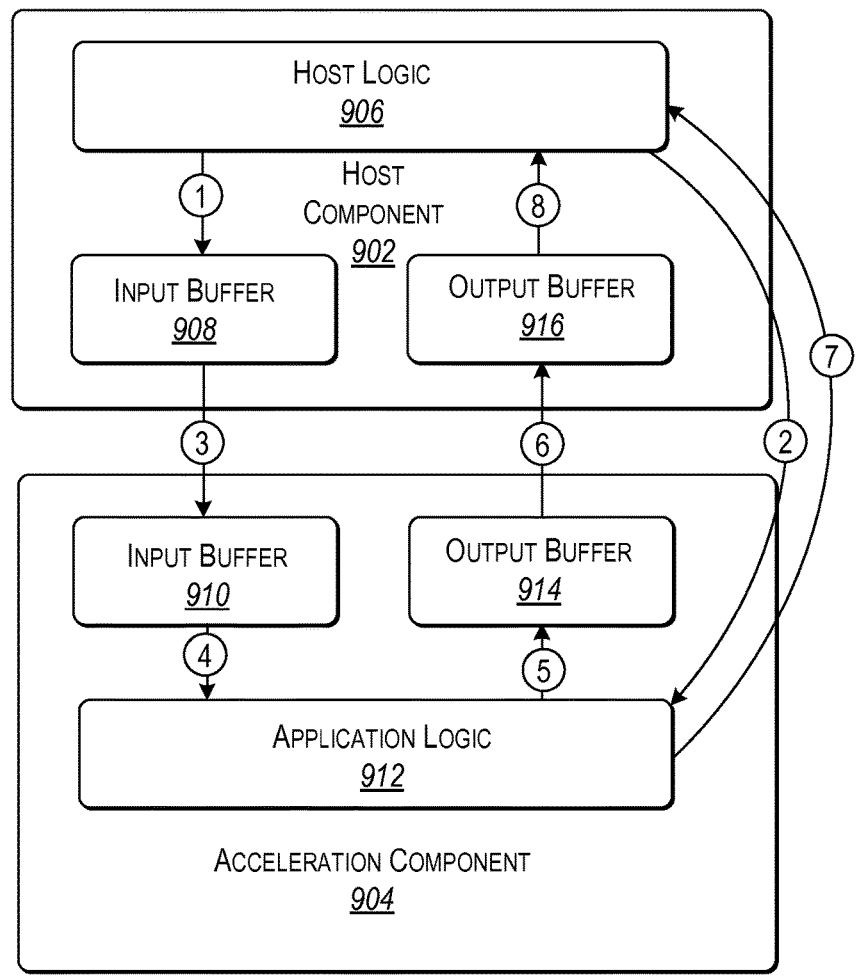
FIG. 9 illustrates functionality for performing data transfer between a local host component and an associated local hardware acceleration component.

FIG. 9 illustrates functionality for performing data transfer between a host component 902 and an associated acceleration component 904. Data can be transferred via a host interface (e.g., host interface 724), for example, using PCIe in conjunction with DMA memory transfer). In operation (1), host logic 906 places data to be processed into kernel-pinned input buffer 908 in main memory associated with the host logic 906. In operation (2), the host logic 906 instructs the acceleration component 904 to retrieve the data and begin processing it. The host logic's thread is then either put to sleep until it receives a notification event from the acceleration component 904, or it continues processing other data asynchronously. In operation (3), the acceleration component 904 transfers the data from the host logic's memory and places it in an acceleration component input buffer 910.

In operations (4) and (5), the application logic 912 retrieves the data from the input buffer 910, processes it to generate an output result, and places the output result in an output buffer 914. In operation (6), the acceleration component 904 copies the contents of the output buffer 914 into output buffer 916 (in the host logic's memory). In operation (7), acceleration component 904 notifies the host logic 906 that the data is ready for it to retrieve. In operation (8), the host logic thread wakes up and consumes the data in the output buffer 916. Host logic 906 may then discard the contents of the output buffer 916, which allows the acceleration component 904 to reuse it in the next loading operation.

Figure 10:
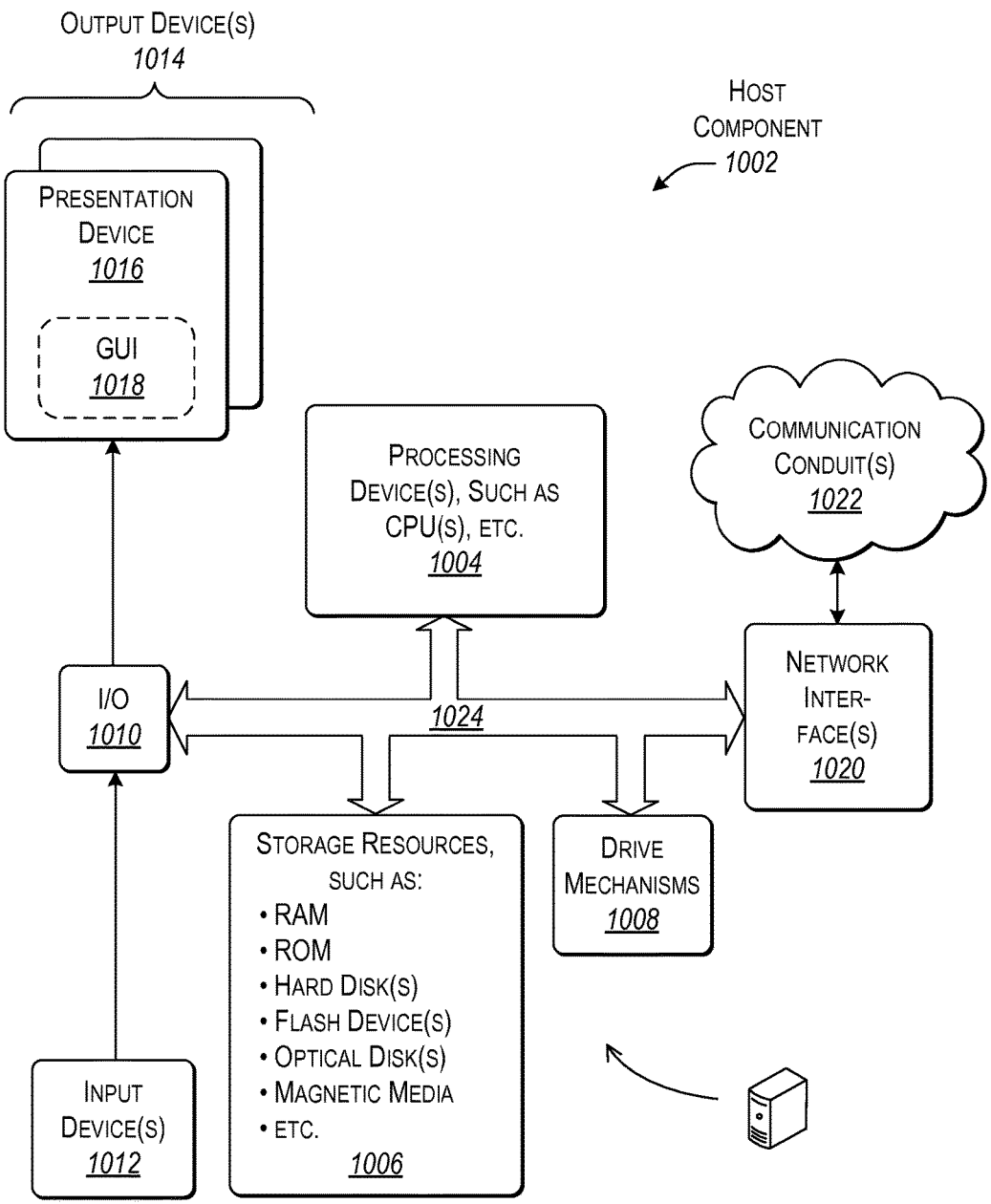
FIG. 10 illustrates an example architecture of a host component.

FIG. 10 illustrates an example architecture of a host component 1002. Host component 1002 can include one or more processing devices 1004, such as one or more central processing units (CPUs). Host component 1002 can also include any storage resources 1006 for storing any kind of information, such as code, settings, data, etc. Without limitation, for instance, storage resources 1006 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of host component 1002. In one case, host component 1002 may perform any of the operations associated with local tenant functionality when processing devices 1004 carry out associated instructions stored in any storage resource or combination of storage resources. Host component 1002 also includes one or more drive mechanisms 1008 for interacting with any storage resource, such as a hard disk drive mechanism, an optical disk drive mechanism, and so on.

Host component 1002 also includes an input/output module 1010 for receiving various inputs (via input devices 1012), and for providing various outputs (via output devices 1014). One particular output mechanism may include a presentation device 1016 and an associated graphical user interface (GUI) 1018. Host component 1002 can also include one or more network interfaces 1020 for exchanging data with other devices via one or more communication conduits 1022. One or more communication buses 1024 communicatively couple the above-described components together.

Communication conduit(s) 1022 can be implemented in any manner, e.g., by a local area network, a wide area network (e.g., the Internet), point-to-point connections, etc., or any combination thereof. Communication conduit(s) 1022 can include any combination of hardwired links, wireless links, routers, gateway functionality, name servers, etc., governed by any protocol or combination of protocols.

A plurality of host components similar to host component 1002 can be included in software plane 104.

Figure 11:
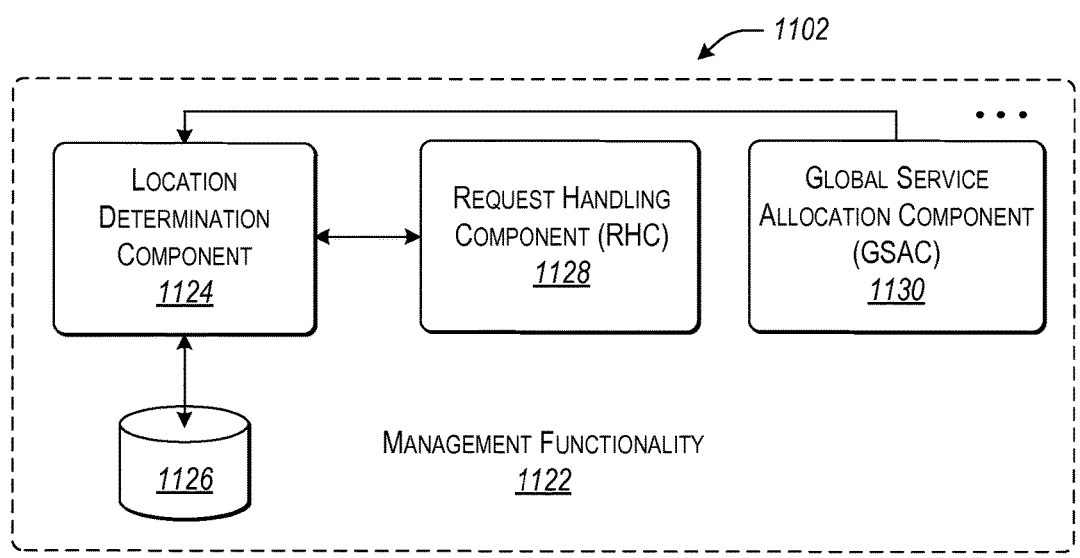
FIG. 11 illustrates an example architecture of management functionality for managing services in a data center.

FIG. 11 illustrates an example architecture 1102 of management functionality 1122 for managing services in a data center. Architecture 1102 can be included in architecture 102. As such, management functionality 1122 as well as other associated components can be implemented on hardware resources of a host component (e.g., in software plane 104) and/or implemented on hardware resources of an acceleration component (e.g., in hardware acceleration plane 106). Host component hardware resources can include any of the hardware resources associated with host component 1002. Acceleration component hardware resources can include any of the hardware resources associated with acceleration component 702.

Management functionality 1122 can include a number of sub-components that perform different respective functions (which can be physically implemented in different ways). A local determination component 1124, for example, can identify the current locations of services within architecture 102, based on information stored in a data store 1126. In operation, location determination component 1124 may receive a request for a service. In response, location determination component 1124 returns an address associated with the service, if that address is present in data store 1126. The address may identify a particular acceleration component in hardware acceleration plane 106 that hosts (or is the head of) the requested service.

Request handling component (RHC) 1128 processes requests for services made by instances of tenant functionality. For example, an instance of tenant functionality may correspond to a software program running on a particular local host component. That software program may request a service in the course of its execution. The RHC 1128 handles the request by determining an appropriate component in architecture 102 to provide the service. Possible components for consideration include: a local acceleration component (associated with the local host component from which the request originated); a remote acceleration component; and/or the local host component itself (whereupon the local host component implements the service in software). RHC 1128 makes its determinations based on one or more request handling considerations, such as whether the requested service pertains to a line-rate service. Further, the RHC 1128 may interact with the location determination component 1124 in performing its functions.

A global service allocation component (GSAC) 1130 can operate in a background and global mode, allocating services to acceleration components based on global conditions in architecture 102 (rather than handling individual requests from instances of tenant functionality, as does RHC 1128). For example, GSAC 1130 may invoke its allocation function in response to a change in demand that affects one or more services. GSAC 1130 makes its determinations based on one or more allocation considerations, such as the historical demand associated with the services, etc. Further, the GSAC 1130 may interact with the location determination component 1124 in performing its functions. A sub-component of GSAC 1130 can also manage multi-component and/or composed services. A multi-component service is a service that is composed of plural parts. Plural respective acceleration components perform the respective parts.

Figure 12:
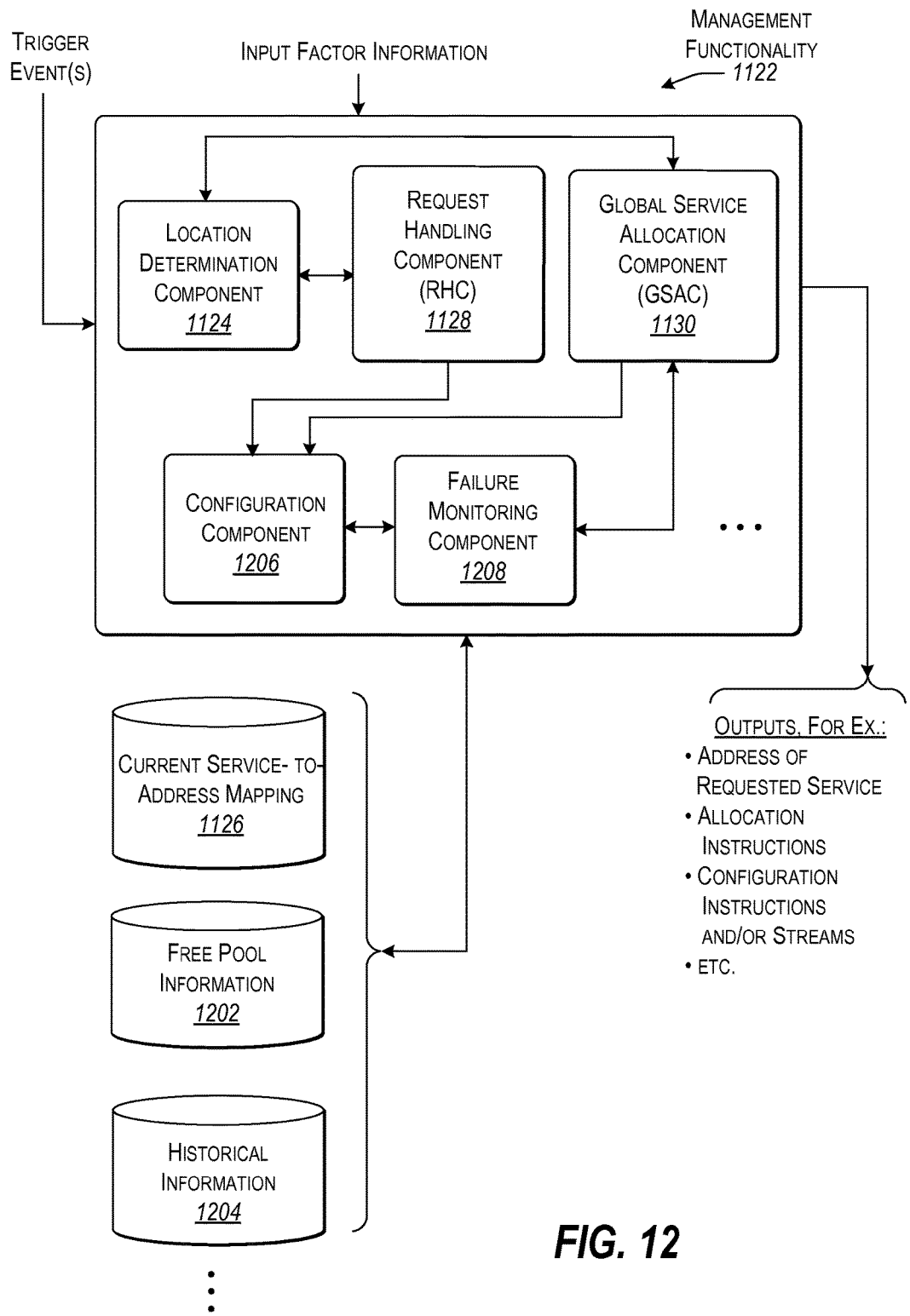
FIG. 12 illustrates an example architecture with additional components of the management functionality of FIG. 11.

FIG. 12 illustrates an example architecture with additional components of management functionality 1122. As described, location determination component 1124 identifies the current location of services within architecture 102, based on information stored in the data store 1126. In operation, the location determination component 1124 receives a request for a service. In response, it returns the address of the service, if present within the data store 1126. The address may identify a particular acceleration component that implements the service.

Request handling component (RHC) 1128 handles requests for services by tenant functionality that resides on the host components. In response to each request by a local host component, RHC 1128 determines an appropriate component to implement the service. For example, RHC 1128 may choose from among: a local acceleration component (associated with the local host component that made the request), a remote acceleration component, or the local host component itself (whereupon the local host component will implement the service in software), or some combination thereof. RHC 1128 performs its determinations based on one or more request handling considerations.

General allocation component (GSAC) 1130, on the other hand, operates by globally allocating services to acceleration components within architecture 102 to meet overall anticipated demand in the data processing system and/or to satisfy other objectives (rather than individual requests by host components). In performing its functions, the GSAC component 1130 may draw on a data store 1202 that provides free pool information. The free pool information identifies acceleration components that have free capacity to implement one or more services. The GSAC 1130 can also receive input information that has a bearing on its allocation decisions. One such piece of input information pertains to historical demand information associated with a service, e.g., as maintained in a data store 1204.

GSAC 1130 and RHC 1128 may use, in part, common logic in reaching their allocation decisions, and that common logic may, in part, taken into account similar allocation considerations. Further, both RHC 1128 and GSAC 1130 interact with the location determination component 124 in the course of performing their respective operations. Otherwise, as described, the GSAC 1130 frames its decisions in a global context, whereas the RHC 1128 is an on-demand component that is primarily focused on satisfying specific requests.

Configuration component 1206 configures acceleration components, e.g., by sending a configuration steam to the acceleration components. A configuration stream specifies the logic (e.g., an image) to be "programmed" into a recipient acceleration component. The configuration component 1206 may use different strategies to configure an acceleration component.

The failure monitoring component 1208 determines whether a previously configured acceleration component has failed. Various components of the management functionality 1122 may respond to failure notification by substituting a spare acceleration component for a failed acceleration component, reconfiguring an acceleration component, partial reconfiguring acceleration component, reloading data in an acceleration component, etc.

As described, functionality for a service or portion thereof can be provided by linking roles from a group of interoperating acceleration components. The linked roles can be composed in a directed graph in any variety of different ways, including a directed acyclic graph, a directed cyclic graph, etc., to provide service functionality and/or acceleration. For example, in some aspects, linked roles are composed in a pipeline or ring.

Figure 13A:
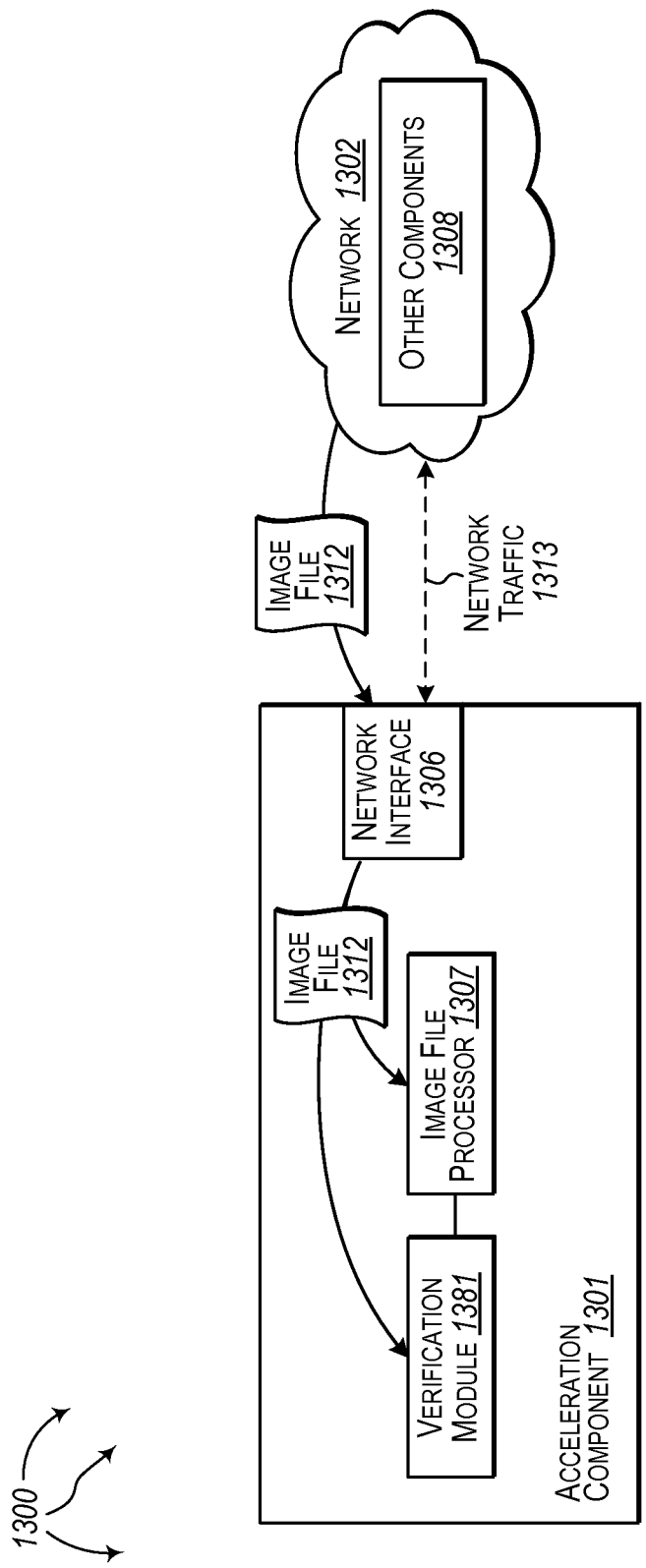
FIGS. 13A-13C illustrate an example architecture for configuring an acceleration component over a network.
Figure 13B:
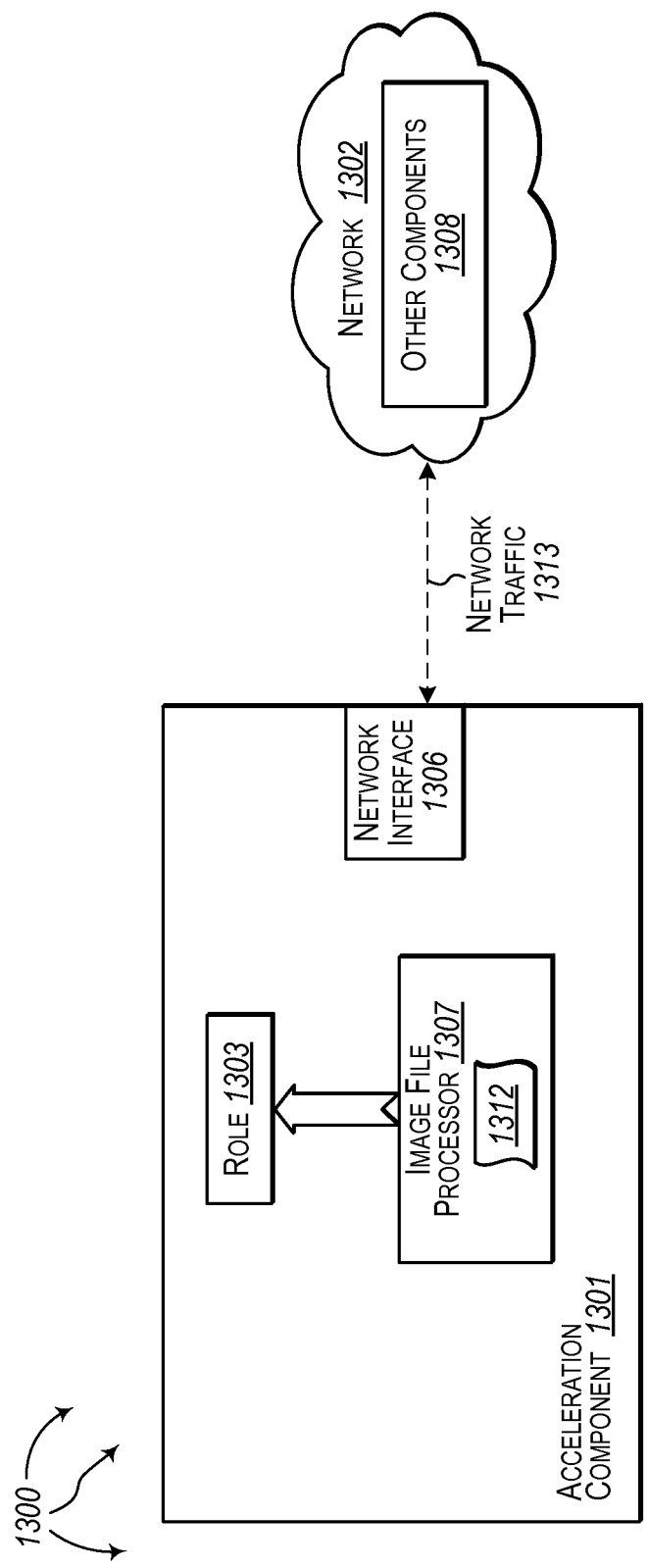
Figure 13C:
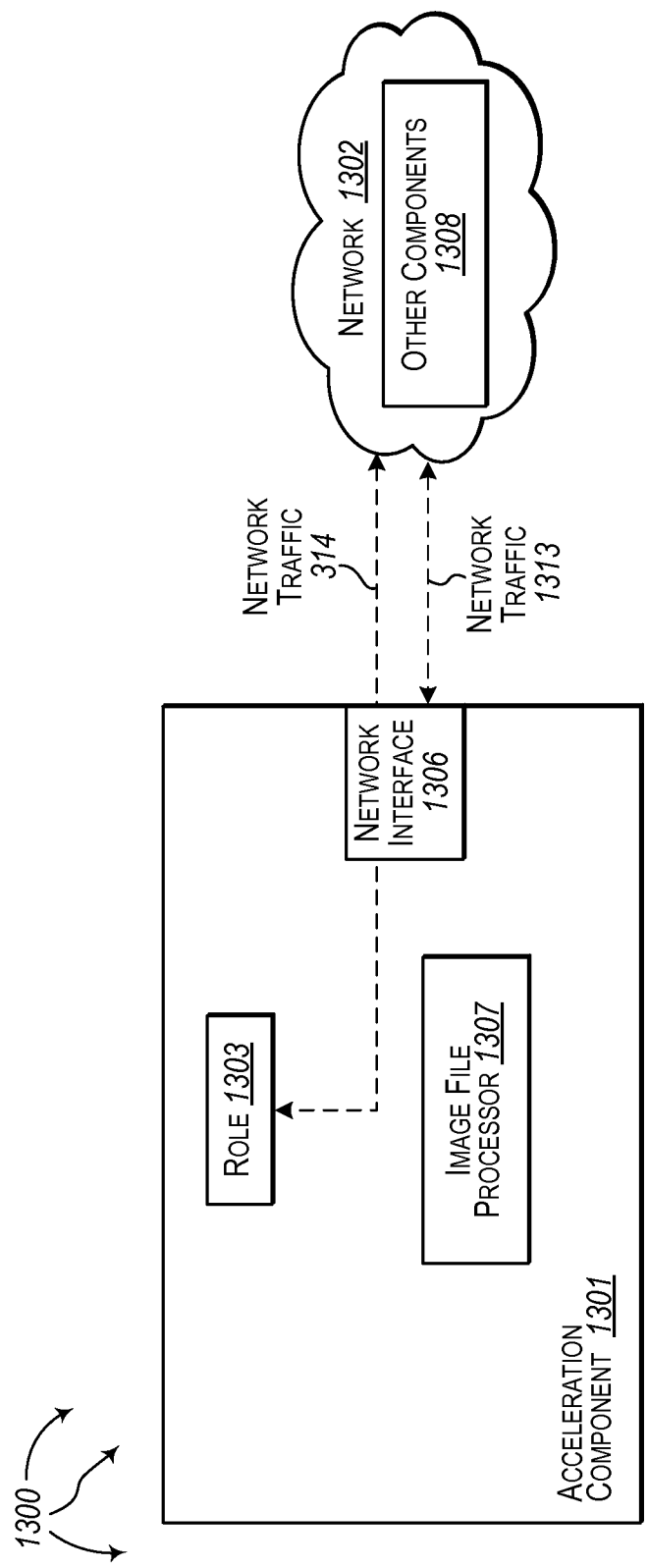

FIGS. 13A-13C illustrate an example architecture 1300 for configuring an acceleration component over a network. Referring initially to FIG. 13A, computer architecture 1300 includes acceleration component 1301 and other components 1308. Acceleration component 1301 and other components 1308 can be connected to (or be part of) network 1302, such as, for example, a Local Area Network ("LAN"), a Wide Area Network ("WAN"), and even the Internet. Accordingly, acceleration component 1301 and other components 1308 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over network 1302. In one aspect, network 1302 represents at least a portion of network infrastructure 120.

As depicted, acceleration component 1301 includes network interface 1306, image file processor 1307, and verification module 1381. In other aspects, image file processor 1307 and/or verification module 1381 are external to acceleration component 1301, such as, for example, at a locally linked host component. When an image file is received at acceleration component 1301 (e.g., through network interface 1306 or a local link), verification module 1381 can verify that the image file is from a legitimate (e.g., network) source. Image file processor 1307 can process an image file to (re)configure roles and other functionality at acceleration component 1301.

Acceleration component 1301 can include an array of programmable logic blocks and hierarchy of reconfigurable interconnects that allow the programmable logic blocks to be connected together in different configurations to provide different functionality (i.e., different roles). Image file processor 1307 can process image files at acceleration to configure programmable logic blocks and configure interconnects to provide desired roles or other functionality at acceleration component 1301.

For example, image file processor 1307 can process an image file to program acceleration component 1301 with network interface 1306. Network interface 1306 facilitates network communication between modules at acceleration component 1301 and other components 1308. Through network interface 1306, modules at acceleration component 1301 (including network interface 1306) can exchange network traffic 1313 with other components 1308. In one aspect, network interface 1306 is hardened such that network interface 1306 remains stable and operational even when acceleration component 1301 is significantly (and possibly otherwise completely) reconfigured.

Image file processor 1307 can also process one or more image files to program acceleration component 1301 with one or more roles. In one aspect, acceleration component 1301 is included in one or more groups of interoperating acceleration components. Within each group of interoperating acceleration components, acceleration component 1301 can provide a role. The role can be linked together with roles at other acceleration components in the group of interoperating components to compose a graph providing hardware acceleration for a service. Alternately, acceleration component 1301 may not include any roles.

Other components 1308 can include other acceleration components (e.g., in hardware acceleration plane 106) and host components (e.g., in software plane 104).

A configuration service can monitor the operation of acceleration component 1301. The configuration service can be a higher level monitoring service (e.g., on network infrastructure 120), at a locally linked host component, or even internal to acceleration component 1301. The configuration service can monitor acceleration component 1301 to detect reasons for changing functionality provided at acceleration component 1301. For example, the configuration service can monitor for functionality exhibiting incorrect behaviors (e.g., errors) either at acceleration component 1301 or at some other acceleration component, for functionality that is to be updated, or for functionality that is to be changed. The configuration service can also detect changing demand for services (increase capacity of one service by decreasing capacity of another service to make room). When the configuration service detects a reason for changing functionality, the configuration service can request an image file from a component within network 1302 to (re)configure acceleration component 1301 to address the detected reason. The image file can be returned to acceleration component 1301.

Figure 14:
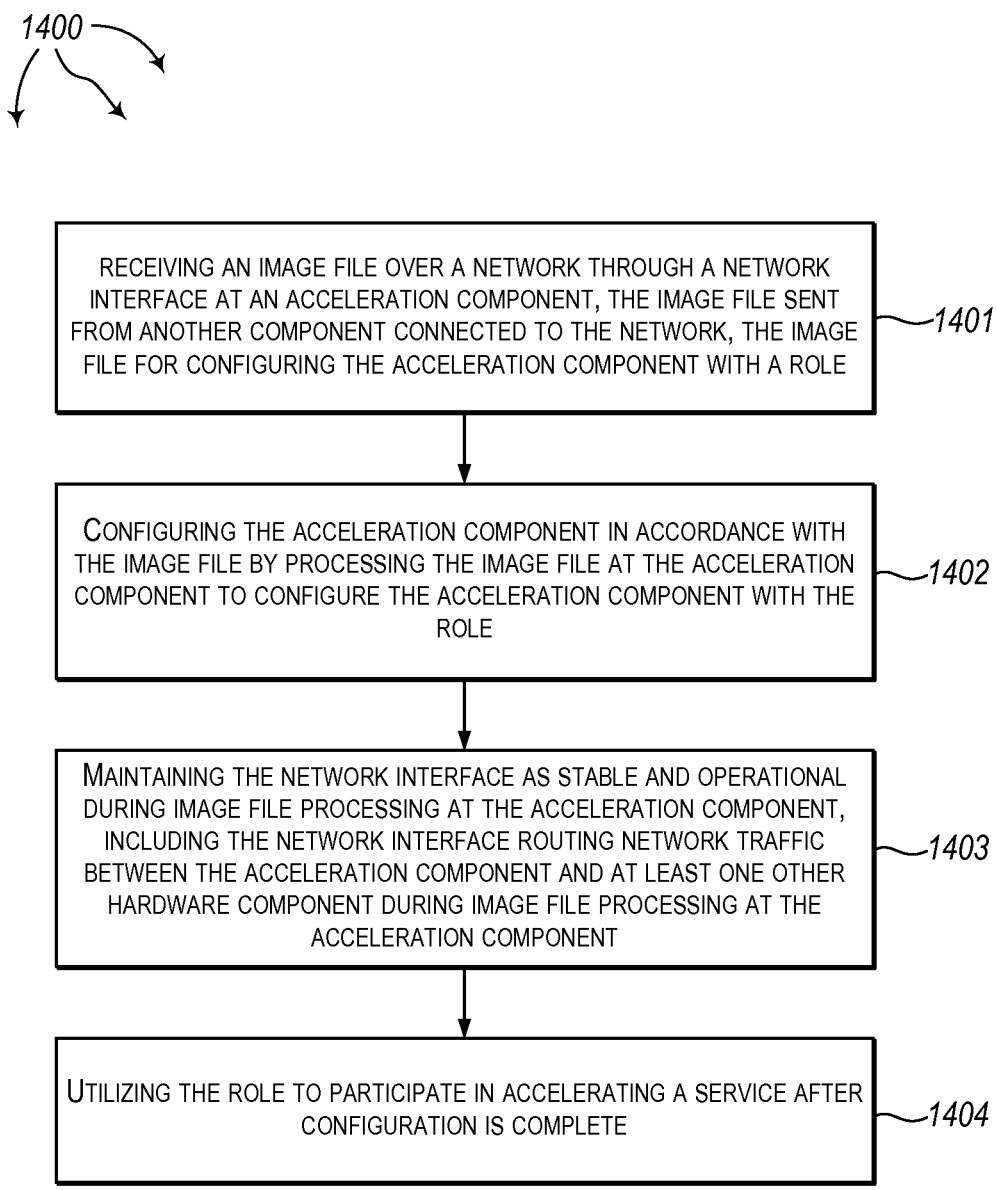
FIG. 14 illustrates a flow chart of an example method for configuring an acceleration component over a network.

Turning to FIG. 14, FIG. 14 illustrates a flow chart of an example method 1400 for reconfiguring an acceleration component over a network. Method 1400 will be described with respect to the components and data of computer architecture 1300.

Method 1400 includes receiving an image file over the network through a network interface at the acceleration component, the image file sent from another component connected to the network, the image file for configuring the acceleration component with a role (1401). For example, acceleration component 1301 can receive image file 1312 through network interface 1306. Image file 1312 can be sent from another component in network 1302 (e.g., one of other components 1308). Image file 1312 is for configuring acceleration component 1301 with role 1303.

Verification module 1381 can verify that image file 1312 is from a legitimate source.

Method 1400 includes configuring the acceleration component in accordance with the image file by processing the image file at the acceleration component to configure the acceleration component with the role (1402). For example, turning to FIG. 13B, acceleration component 1301 can be configured in accordance image file 1312. Image file processor 1307 can process image file 1312 to configure acceleration component 1301 with role 1303.

Method 1400 includes maintaining the network interface as stable and operational during image file processing at the acceleration component, including the network interface routing network traffic between the acceleration component and at least one other hardware component during image file processing at the acceleration component (1403). For example, network interface 1306 can be maintained as stable and operational during processing of image file 1312 at acceleration component 1301. Network interface 1306 can route network traffic between acceleration component 1301 and at least one component (e.g., a higher level configuration service) in other components 1308 during processing of image file 1312 at acceleration component 1301.

In one aspect, network interface 1306 is hardened. As such, network interface 1306 can remain stable and operational during any level of (re)configuration of acceleration component 1301 ranging up to essentially complete (re)configuration. In another aspect, network interface 1306 is not hardened. In this other aspect, network interface 1306 (and any other functionality) can remain stable and operational during a partial reconfiguration unrelated to network interface 1306 (or the other functionality). For example, network interface 1306 and one or more roles can remain stable and operational (and the one or more roles can use network interface 106 to transfer network traffic) during reconfiguration of another role at acceleration component 1301.

Method 1400 includes utilizing the role to participate in accelerating a service after configuration is complete (1404). For example, turning to FIG. 13C, role 1303 can participate in accelerating a service after configuration of role 1303 is complete. For example, role 1303 can exchange network traffic 1314 with other roles in network 1302 (e.g., composed into a graph) to facilitate service acceleration. When appropriate, a higher level service can link role 1303 with upstream and downstream components in a graph and notify the upstream and downstream components that role 1303 is operational. Upstream and downstream components can then take appropriate actions to interoperate with role 1303.

Figure 15A:
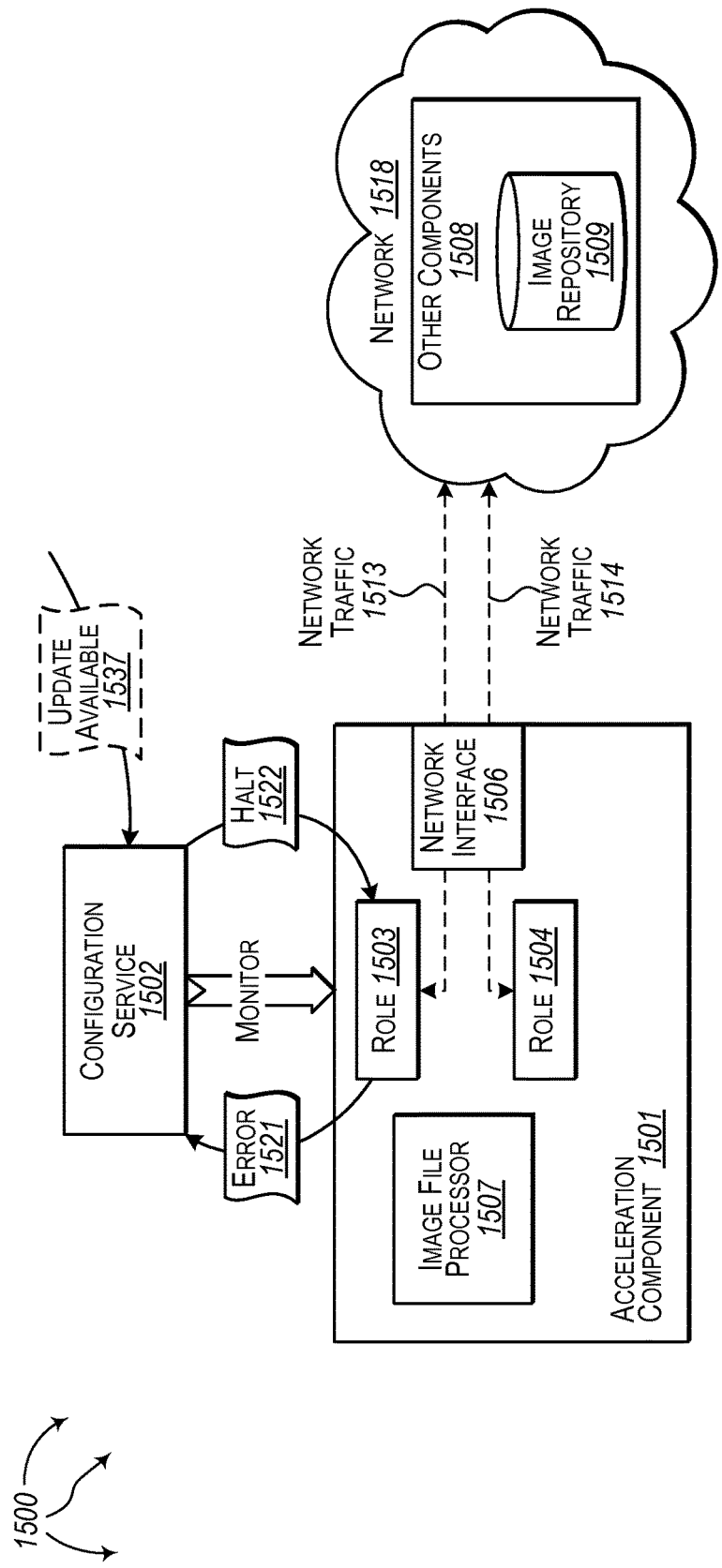
FIGS. 15A-15C illustrate an example architecture for configuring an acceleration component over a network.
Figure 15B:
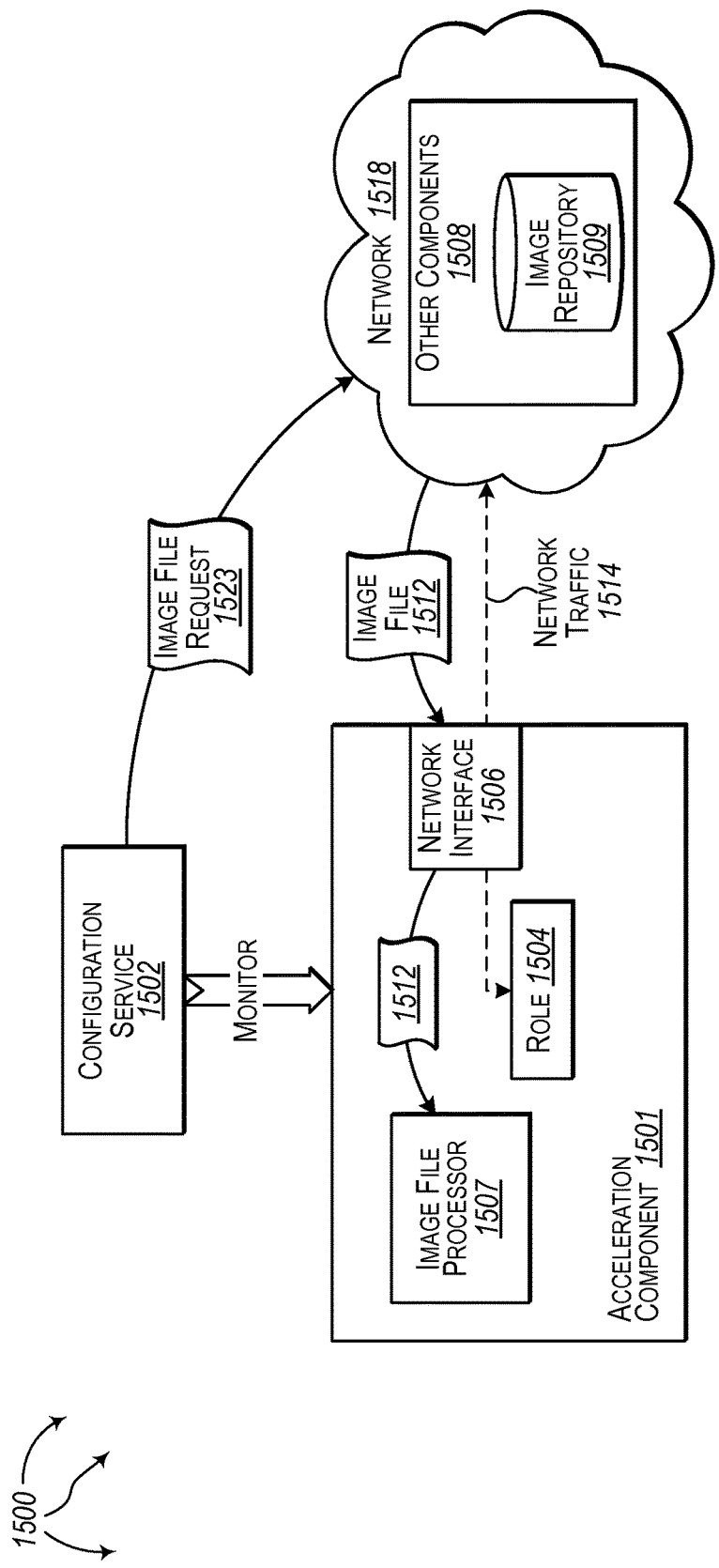
Figure 15C:
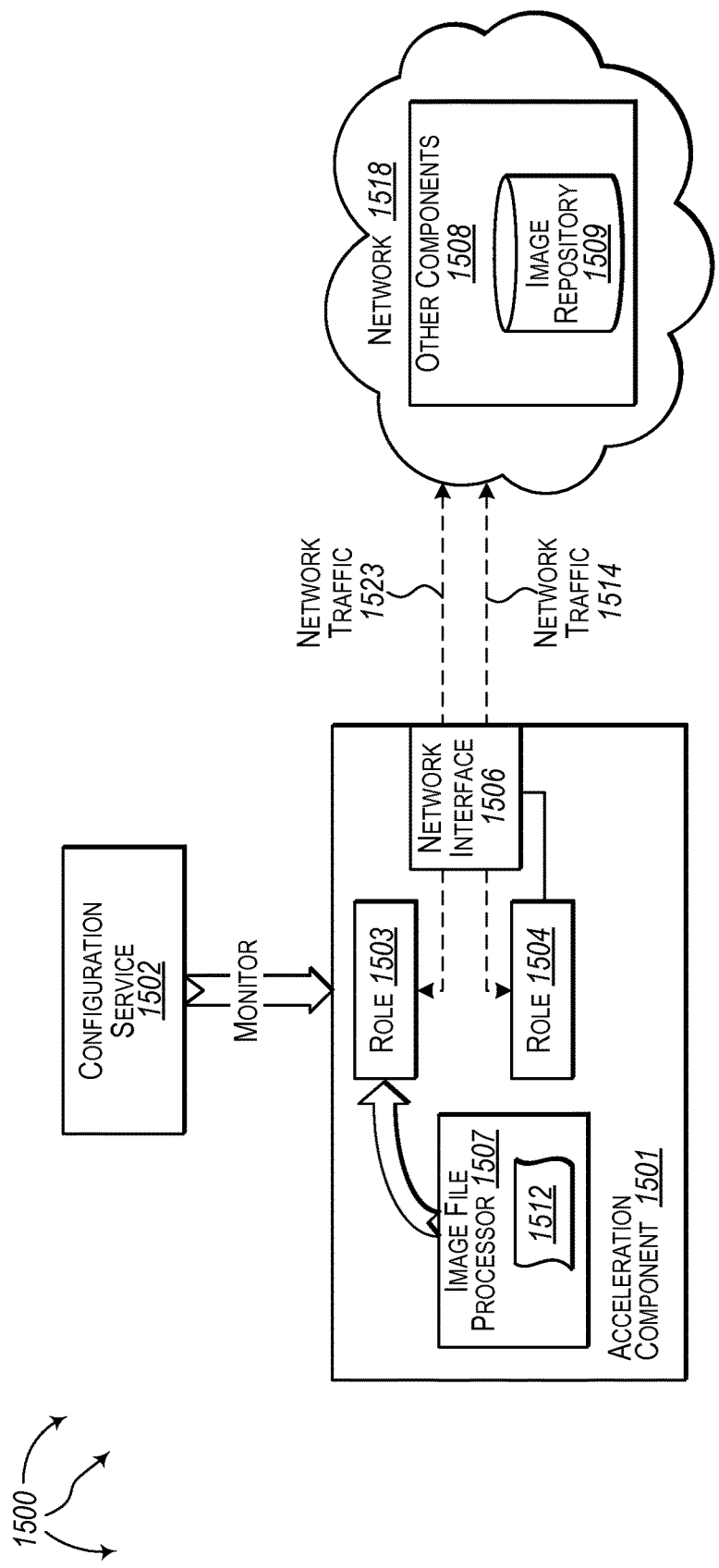

FIGS. 15A-15C illustrate an example architecture 1500 for configuring an acceleration component over a network. Referring initially to FIG. 15A, computer architecture 1500 includes acceleration component 1501, configuration service 1502, and other components 1508. Acceleration component 1501, configuration service 1502, and other components 1508 can be connected to (or be part of) network 1518, such as, for example, a Local Area Network ("LAN"), a Wide Area Network ("WAN"), and even the Internet. Accordingly, acceleration component 1501, configuration service 1502, and other components 1508 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over network 1518. In one aspect, network 1518 represents at least a portion of network infrastructure 120.

As depicted, acceleration component 1501 includes network interface 1506, image file processor 1507, and can also include a verification module (not shown). In other aspects, image file processor 1507 and/or the verification module are external to acceleration component 1501, such as, for example, at a locally linked host component. When an image file is received at acceleration component 1501 through network interface 1506, the verification module can verify that the image file is from a legitimate network source. Image file processor 1507 can process the image file to (re)configure roles and other functionality at acceleration component 1501.

Acceleration component 1501 can include an array of programmable logic blocks and hierarchy of reconfigurable interconnects that allow logic blocks to be connected together in different configurations (to provide different functionality (i.e., different roles)). Image files can be received from components in network 1518 and loaded at acceleration component 1501 to configure programmable logic blocks and configure interconnects to provide desired functionality.

Acceleration component 1501 can be included in one or more groups of interoperating acceleration components. Within each group of interoperating components, acceleration component 1501 can provide a role. The role can be linked together with roles at other acceleration components in the group of interoperating components to compose a graph providing hardware acceleration for a service. For example, role 1503 can be composed into one graph and role 1504 can be composed into another different graph.

Other components 1508 can include other acceleration components (e.g., in hardware acceleration plane 106) and host components (e.g., in software plane 104). Other components 1508 also include image repository 1509. Image repository 1509 can be a centralized repository of image files that can be distributed to configure acceleration components in hardware acceleration plane 106. Centralized repository 1509 relieves a locally linked host for acceleration component 1501 from having to use local storage resources to store image files.

Network interface 1506 facilitates network communication between role 1503 and other components 1508 and between role 1504 and other components 1508. For example, role 1503 can exchange network traffic 1513 with other components 1508. Network traffic 1513 can include network traffic originating at role 1503 or network traffic being routed from one component in other components 1308 to another component in other components 1508 (e.g., between components in a graph). Similarly, role 1504 can exchange network traffic 1514 with other components 1508. Network traffic 1514 can include network traffic originating at role 1504 or network traffic being routed from one component in other components 1508 to another component in other components 1308 (e.g., between components in a graph).

Configuration service 1502 can monitor the operation of acceleration component 1501. Configuration service 1502 can be a higher level monitoring service (e.g., on network infrastructure 120), at a locally linked host component, or even internal to acceleration component 1301. Configuration service 1502 can monitor acceleration component 1501 for incorrect behaviors, for functionality that is to be updated, and for functionality that is to be changed. When configuration service 1502 detects incorrect behavior, that an update is appropriate, or that a change is appropriate, configuration service 1502 can initiate reconfiguration of acceleration component 1501. Reconfiguration can range from less extensive reconfiguration, such as, for example, changing a single role at acceleration component 1501, to more extensive reconfiguring, such as, for example, essentially completely reconfiguring acceleration component 1501. When configuration service 1502 is internal to acceleration component 1501, acceleration component 1501 can self-initiate network reconfiguration.

In one aspect, configuration service 1502 can detect error 1521 in the operation of role 1503. Alternately, configuration service 1502 can receive update available message 1537 indicating that there is an update available to 1503. Alternately, configuration service 1502 can determine that the configuration of acceleration component 1501 is to be changed (e.g., to meet changed demands for service acceleration). To facilitate reconfiguration, configuration service 1502 sends halt message 1522 to role 1503. In response, role 1503 can halt operation. When appropriate, configuration service 1502 can also notify upstream and downstream components of role 1503 (e.g., in the same graph) that role 1503 is being halted. Upstream and downstream components can then take appropriate actions with in-process data (e.g., buffer, drop, send NACKs to other components, etc.) until role 1503 is again operational.

Turning to FIG. 15B, configuration service 1502 sends image file request 1523 to image repository 1509 to request an image file for acceleration component 1501. In response, image repository 1509 returns image file 1512 to acceleration component 1501. Acceleration component 1501 receives image file 1512 through network interface 1506. Image 1512 can be selected to address a reason for reconfiguration, such as, for example, to correct error 1521, to update functionality at acceleration component 1501, to address an error at another acceleration component, or to change functionality at acceleration component 1501 to adjust for changing demand for services.

Turning to FIG. 15C, image file processor 1507 can process image file 1512 to reprogram programmable logic blocks and reconfigurable interconnects at acceleration component 1501 with role 1503. In one aspect, processing image file 1512 reloads role 1503 to correct error 1521. In another aspect, processing image file 1512 updates role 1503. In a further aspect, processing image file 1512 configures acceleration component 1501 with a role other than role 1303.

Role 1504 and network interface 1506 can be maintained as stable and operational during processing of image file 1512. As such, role 1504 can continue to route network traffic 1514 between acceleration component 1501 and other components 1508 through network interface 1506 during processing of image file 1512.

When image file 1512 is successfully processed, role 1303 can send a configuration complete message to configuration service 1302. In response to the configuration complete message, configuration service 1502 can re-activate command role 1503. Once activated, role 1503 can again process data and route network traffic. When appropriate, configuration service 1502 can link role 1503 with upstream and downstream components in a graph and notify the upstream and downstream components that role 1503 is operational. Upstream and downstream components can then take appropriate actions to interoperate with role 1503.

For example, role 1503 can exchange network traffic 1523 with other components 1508. Network traffic 1523 can include network traffic originating at role 1503 or network traffic being routed from one component in other components 1508 to another component in other components 1508 (e.g., between components in a graph).

Figure 16A:
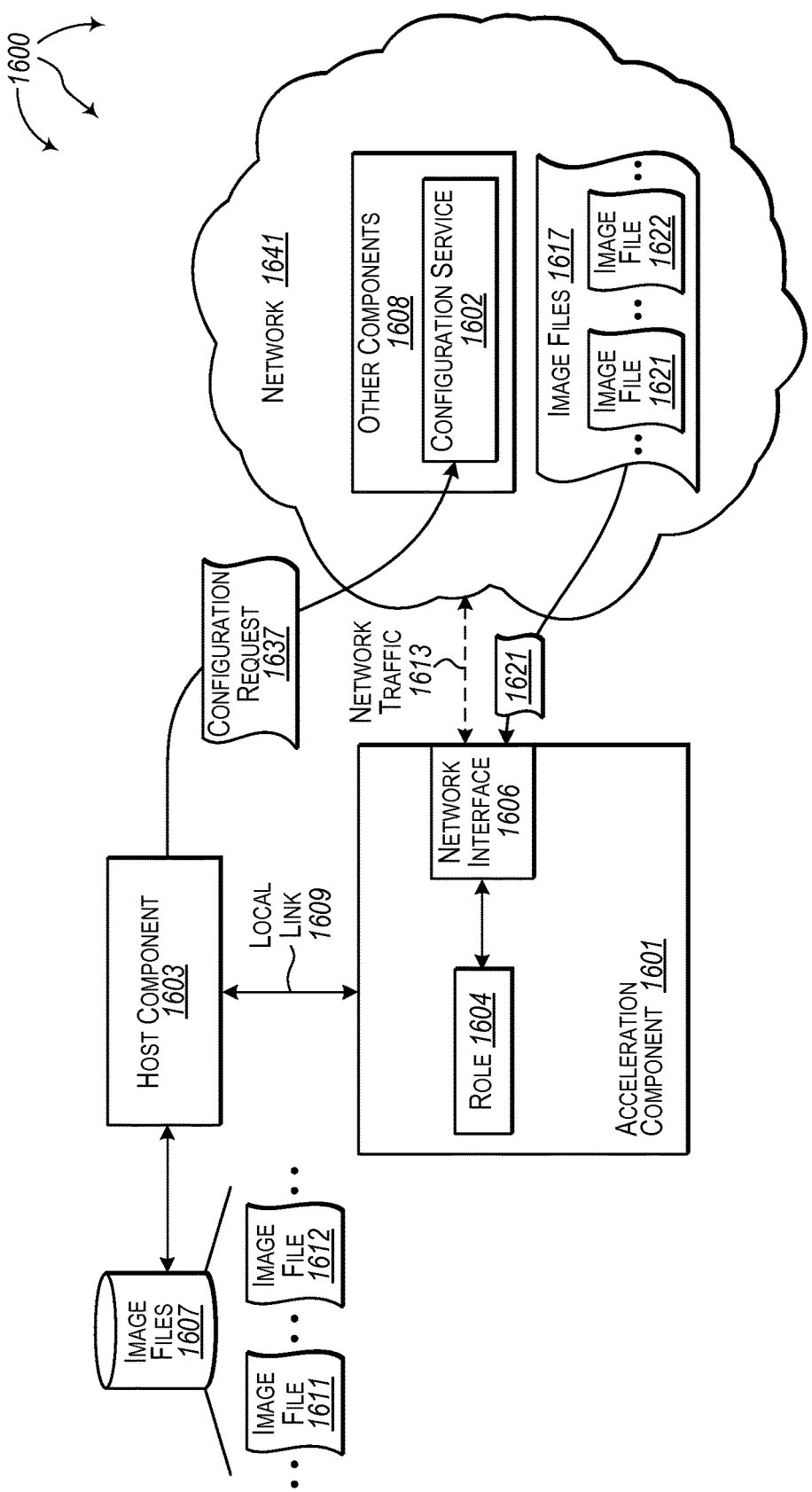
FIGS. 16A and 16B illustrate an example architecture for configuring an acceleration component over a network.
Figure 16B:
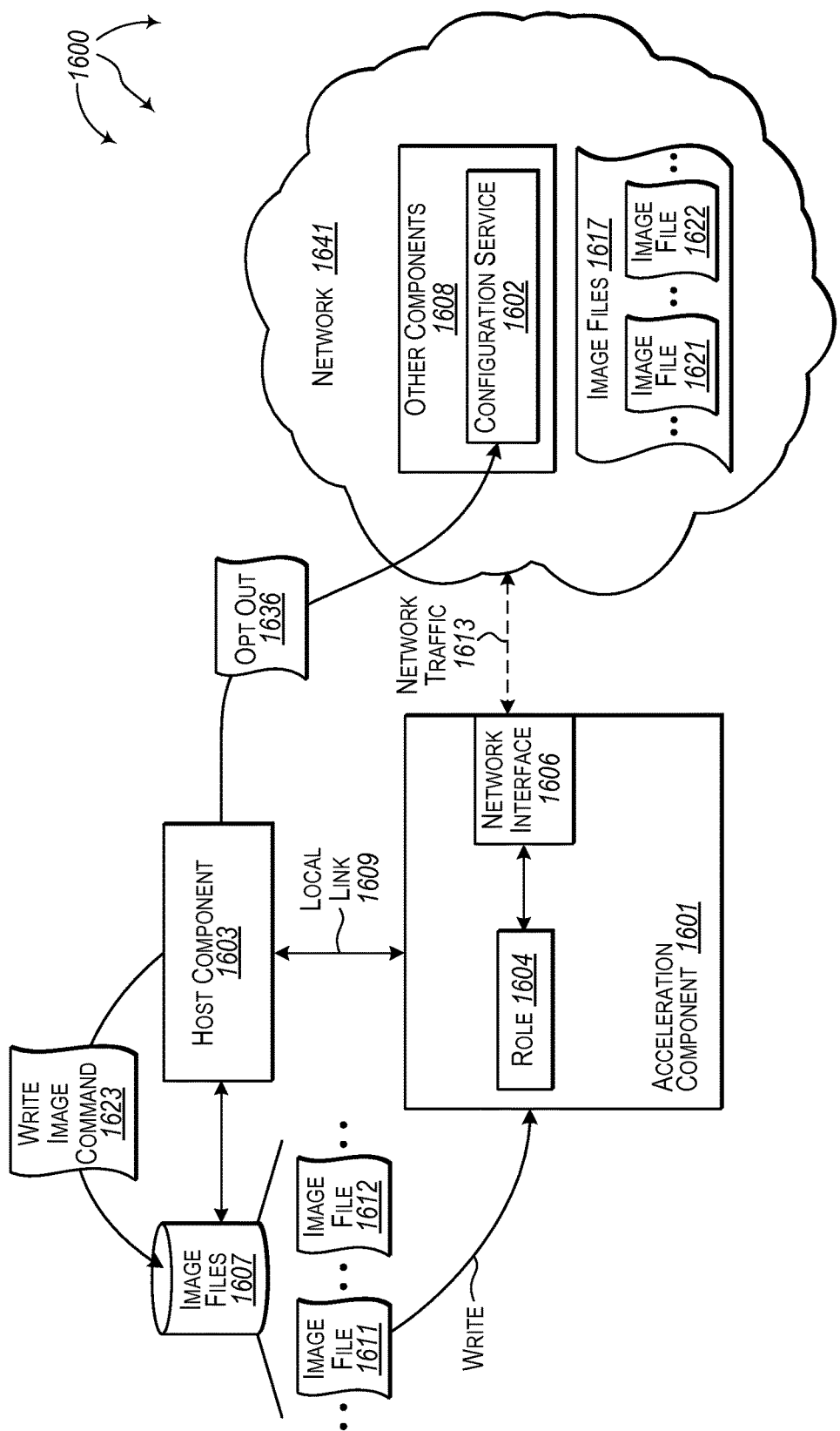

FIGS. 16A and 16B illustrate an example architecture 1600 for configuring an acceleration component over a network. Referring initially to FIG. 16A, computer architecture 1600 includes acceleration component 1601, host component 1603, and other components 1608. Acceleration component 1601, host component 1603, and other components 1608 can be connected to (or be part of) network 1641, such as, for example, a Local Area Network ("LAN"), a Wide Area Network ("WAN"), and even the Internet. Accordingly, acceleration component 1601, host component 1603, and other components 1608 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over network 1641. In one aspect, network 1641 represents at least a portion of network infrastructure 120.

As depicted, host component 1601 is coupled to acceleration component 1601 through local link 1609 (e.g., a PCIe link). Host component 1603 also includes local storage storing image files 1607, including image file 1611, image file 1612, etc.

Acceleration component 1601 includes role 1604 and network interface 1606. Role 1604 and any other components at acceleration component 1601 can use network interface 1606 to exchange network traffic 1613 with other components 1608. Role 1604 can be linked with one or more other roles in network 1641 in a composed graph to provide service acceleration.

Other components 1608 includes configuration service 1602 and images 1617. Configuration service 1602 can be a higher level service that manages roles and graphs across a plurality of acceleration components. Image files 1617 includes image files 1621, 1622, etc. Image files 1617 can be stored in one or more repositories in network 1641.

Host component 1603 can monitor acceleration component 1601 over local link 1609. When host component 1603 detects a reason for changing configuration of acceleration component 1601, host component 1603 can send configuration request 1637 to request an image file to implement the configuration change. In one aspect, configuration request 1637 is sent to configuration service 1602. Based on configuration request 1637, configuration service 1602 can identify image file 1521 as an appropriate image. In another aspect, host component 1603 sends configuration request 1637 to a repository storing image file 1621 to directly request image file 1621.

Image file 1621 can be sent to acceleration component 1601. Acceleration component 1601 can receive image file 1621 at network interface 1605. An image file processor (not shown) can process image file 1621 to at least partially (re)configure acceleration component 1601. Role 1604 and network interface 1606 can remain stable and operational during processing of image file 1621. Any roles added at acceleration component 1601 can be linked to other roles in network 1641 to compose graphs for service acceleration.

Turning to FIG. 16B, host component 1603 can send opt out message 1636 to configuration service 1602. Opt out message 1636 notifies configuration service 1602 that acceleration component 1601 is opting out of (i.e., not participating in) network configuration. Instead, host component 1603 handles any (re)configuration of acceleration component 1601 from image files 1607. For example, host component 1603 can send write image command 1623 to image files 1632 to select image file 1611. In response, image file 1611 is written to acceleration component 1601.

An image file processor (not shown) can process image file 1611 to at least partially (re)configure acceleration component 1601. Role 1604 and network interface 1606 can remain stable and operational during processing of image file 1611. Any roles added at acceleration component 1601 can be linked to other roles in network 1641 to compose graphs for service acceleration.

Figure 17A:
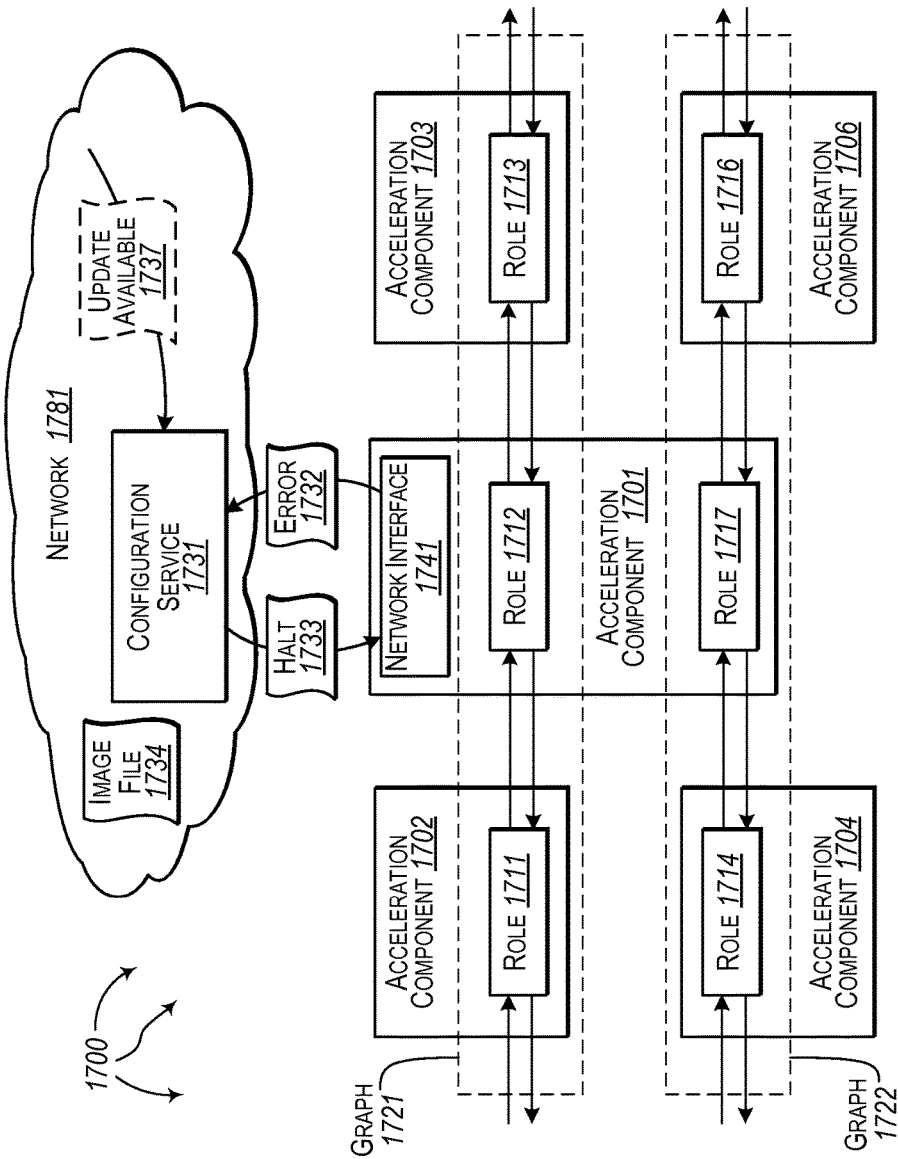
FIGS. 17A-17C illustrate an example network architecture for configuring an acceleration component that has roles included in multiple graphs over a network.
Figure 17B:
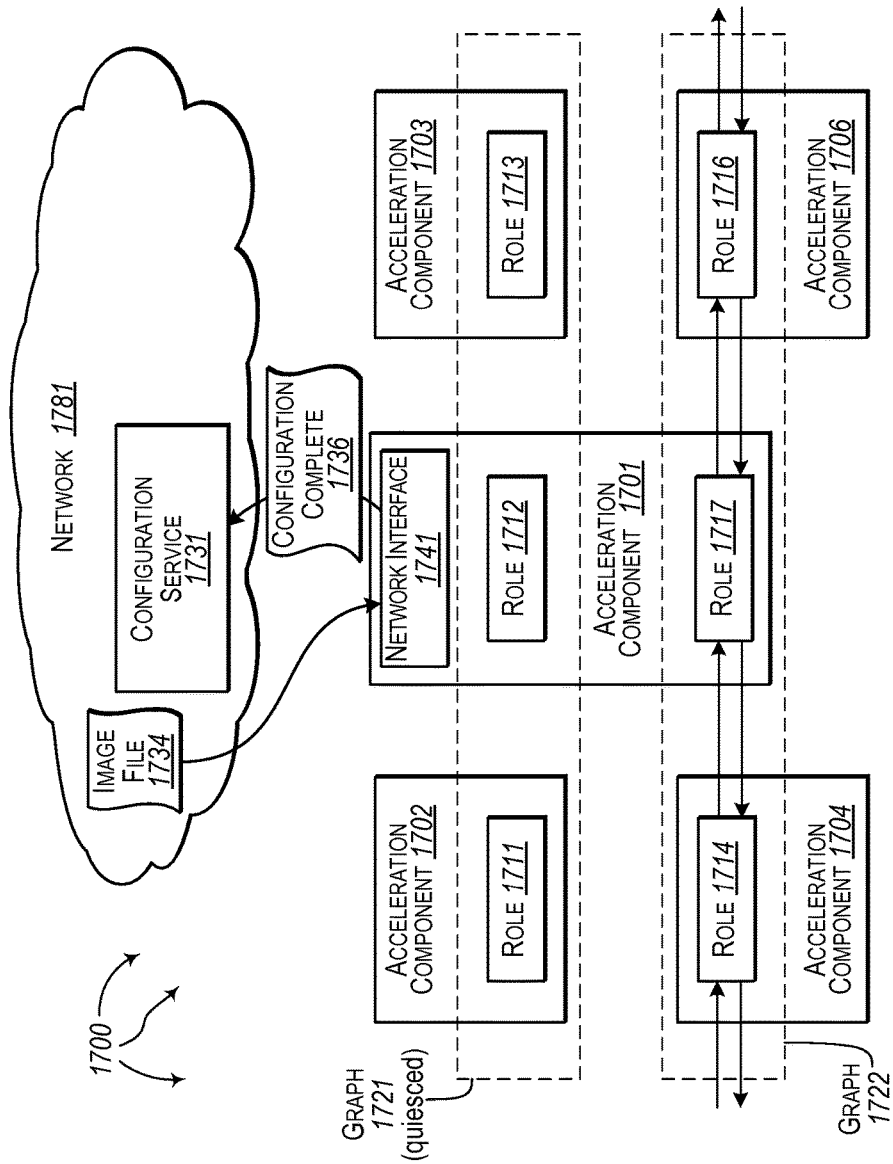
Figure 17C:
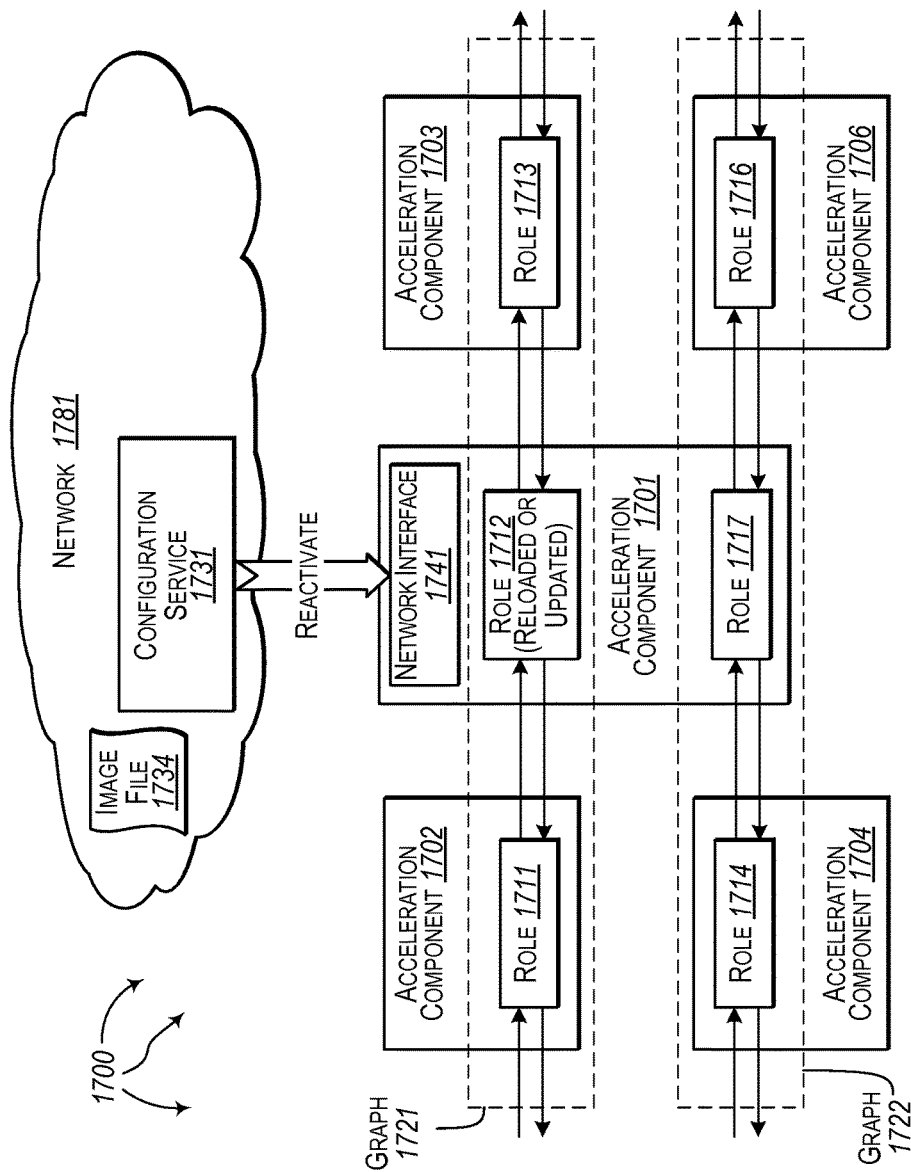

FIGS. 17A-17C illustrate an example network architecture 1700 for configuring an acceleration component that has roles included in multiple graphs over a network. As depicted, network architecture 1700 includes configuration service 1731 and acceleration components 1701, 1702, 1703, 1704, and 1706. Configuration service 1731 and acceleration components 1701, 1702, 1703, 1704, and 1706 can all be connected to network infrastructure 120. Acceleration components 1701, 1702, 1703, 1704, and 1706 (e.g., FPGAs) can be included in a hardware acceleration plane, such as, hardware acceleration plane 106. The depicted arrangement of acceleration components 1701, 1702, 1703, 1704, and 1706 is logical. The physical proximity of acceleration components 1701, 1702, 1703, 1704, and 1706 to one another can vary (e.g., same server, different servers same rack, different racks, etc.). Acceleration component 1701 further includes network interface 1741

Acceleration component 1701 is programmed with roles 1712 and 1717.

Each of acceleration components 1702, 1703, 1704, and 1706 are programmed with a specified role 1711, 1713, 1714, and 1716 respectively. Roles 1711, 1712, and 1713 are linked to one another to compose graph 1721. Graph 1721 can provide hardware acceleration for a service. Roles 1714, 1717, and 1716 are linked together to compose graph 1722. Graph 1722 can provide hardware acceleration for another different service.

Input and output from roles at (logically) neighboring acceleration components may depend on one another or input and output from other components (e.g., host components or functionality composed from a different group of interoperating acceleration components). For example, input to role 1712 can depend on output from role 1711. Similarly, input to role 1713 can depend on output from role 1712.

Some or all of acceleration components 1701, 1702, 1703, 1704, and 1706 can participate in one-way or two-way communication with (logically) neighboring acceleration components and other components (e.g., host components). Thus, input and output from one acceleration component can depend on input and output from another acceleration component and vice versa. For example, input to role 1711 can depend on output from role 1712 and input to role 1712 can depend on output from role 1713.

A graph can represent a composed grouping of acceleration functionality or a portion thereon. For example, graph 1721 can provide acceleration for part of a document ranking service used to provide search engine results. Graph 1721 can interoperate with other portions of service functionality composed from other groups of interoperating acceleration components and/or provided by one or more host components. For example, for a document ranking service, document feature extraction can be composed from one group of interoperating acceleration components, free form expression calculations can be composed from another group of interoperating acceleration components, and scoring calculations can be composed from a further group of interoperating acceleration components.

Graph 1722 can provide acceleration for another part of the document ranking service or can provide acceleration for some other service (e.g., encryption, compression, computer vision, speech translation, etc.).

Configuration service 1731 can monitor the other components depicted in network architecture 1700. During monitoring, configuration service 1731 can detect error 1732 in role 1712. Alternately, configuration service 1731 can detect update available message 1737 indicating that there is an update available for role 1712. In response, configuration service 1731 can send halt command 1733 to graph 1721. Halt command 1733 halts operation of role 1712 as well as quiescing graph 1721. Quiescing graph 1721 stops all network traffic flowing into and out of graph 1721. Halt command 1733 also instructs roles 1711 and 1713 to ignore any data coming out of role 1712.

When appropriate, configuration service 1731 can also notify upstream and downstream components of role 1712 (e.g., in the same graph) that role 1712 is being halted. Upstream and downstream components can then take appropriate actions with in-process data (e.g., buffer, drop, send NACKs to other components, etc.) until role 1712 is again operational.

Turning to FIG. 17B, when graph 1721 is quiesced, configuration service 1731 can send image file 1734 over a network interface 1741 to acceleration component 1701. Network interface 1741 can receive image file 1734. Image file 1734 can be processed at acceleration component 1701 to reconfigure the functionality of role 1712. Role 1712 can be reconfigured to correct an error or failure, to update, etc. Processing image file 1734 can include reloading a new image (either of role 1712 or an updated role 1712) on acceleration component 1711.

During processing of image file 1734, other roles at acceleration component 1701 can continue to operate as intended while role 1712 is reconfigured. For example, role 1717 can continue to interoperate and exchange network traffic with roles 1714 and 1716 through network interface 1741 during processing of image file 1734. When reconfiguration of role 1712 is complete, role 1712 can send configuration complete message 1736 to configuration service 1531.

Turning to FIG. 17C, configuration service 1731 can then reactivate role 1712 (reloaded or updated). Configuration service 1731 can reintegrate role 1712 into graph 1721 and reactivate graph 1721.

Figure 18:
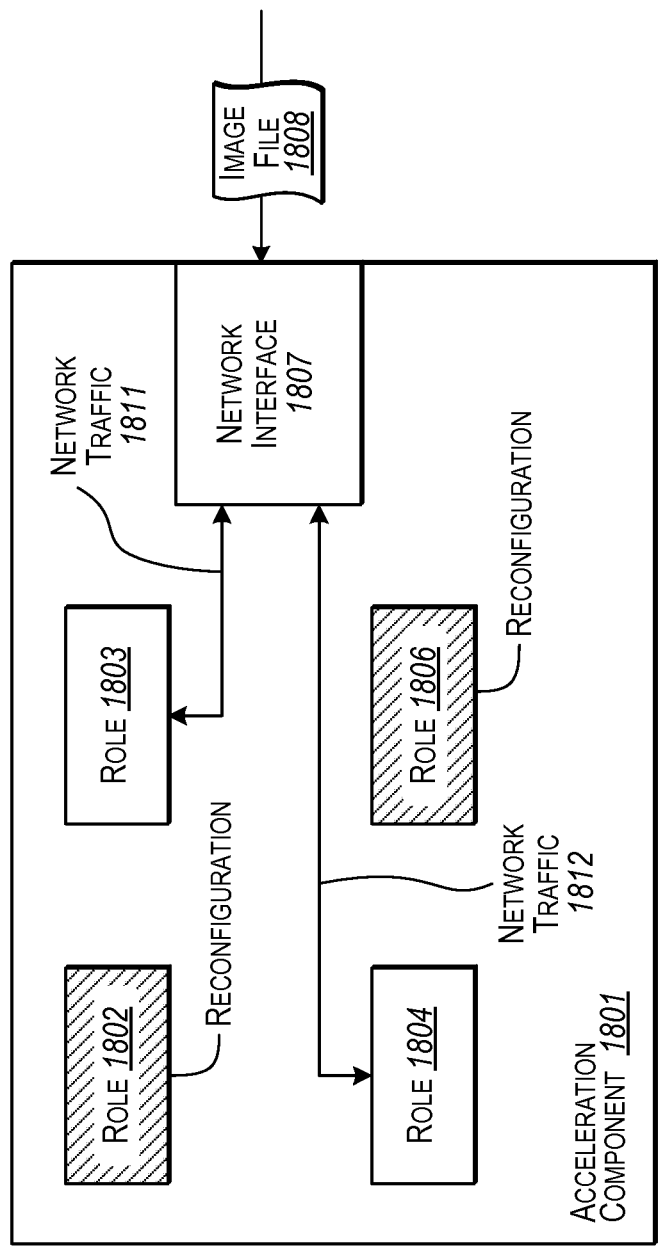
FIG. 18 illustrates an example of configuring an acceleration component over a network.

Turning to FIG. 18, FIG. 18 illustrates an example of configuring an acceleration component 1801 over a network. As depicted, acceleration component 1801 includes roles 1802, 1803, 1804, and 1806 and network interface 1807. Image file 1808 is received at network interface 1807. Image file 1808 is processed to reconfigure roles 1802 and 1806. Roles 1803 and 1804 can exchange network traffic 1811 and 1812 respectively with other components through network interface 1807 while roles 1802 and 1806 are being reconfigured.

In general, the described aspects are advantageous for managing acceleration components and accelerated services from a centralized service. The descried aspects are also advantageous for relieving host components from having to store (potentially diverse and numerous) image files.

In some aspects, a system includes a hardware acceleration plane, a software plane, and a network infrastructure. The hardware acceleration plane includes a configurable fabric of a plurality of acceleration components. The software plane includes a plurality of host components running software. The network infrastructure is shared by acceleration components in the hardware acceleration plane and host components in the software plane. The network infrastructure is used by acceleration components to communicate directly with one another. Local links connect acceleration components and host components (e.g., in the same server).

The system also includes one or more computer storage devices having stored thereon computer-executable instructions for configuring an acceleration component over a network. Configuring an acceleration component includes receiving an image file over the network infrastructure through a network interface at the acceleration component. The image file is sent from another component connected to the network infrastructure and the image file is for configuring the acceleration component with a role.

Configuring the acceleration component includes configuring the acceleration component in accordance with the image file by processing the image file at the acceleration component. Processing the image file configures the acceleration component with the role. The acceleration component is configured without knowledge of a locally linked host component. Configuring the acceleration component includes maintaining the network interface as stable and operational during image file processing at the acceleration component. The network interface routes network traffic between the acceleration component and at least one other hardware component during image file processing at the acceleration component. Configuring the acceleration component includes utilizing the role to participate in accelerating a service after configuration is complete.

In another aspect, a method for reconfiguring an acceleration component over a network is performed. An image file is received over a network through a network interface at the acceleration component. The image file is sent from another component connected to the network and the image file for configuring the acceleration component with a role. The acceleration component is configured in accordance with the image file by processing the image file at the acceleration component to configure the acceleration component with the role. The acceleration component is configured without knowledge of a locally linked host component.

The network interface is maintained as stable and operational during image file processing at the acceleration component. The network interface routes network traffic between the acceleration component and at least one other hardware component during image file processing at the acceleration component. The role is utilized to participate in accelerating a service after configuration is complete.

In another aspect, a computer program product for use at a computer system includes one or more computer storage devices having stored thereon computer-executable instructions that, in response to execution at a processor, cause the computer system to implement a method for configuring an acceleration component over a network.

The computer program product includes computer-executable instructions that, in response to execution at a processor, cause the computer system to receive an image file over the network through a network interface at the acceleration component. The image file is sent from another component connected to the network and the image file is for configuring the acceleration component with a role. The computer program product includes computer-executable instructions that, in response to execution at a processor, cause the computer system to configure the acceleration component in accordance with the image file by processing the image file at the acceleration component to configure the acceleration component with the role. The acceleration component is configured without knowledge of a locally linked host component.

The computer program product includes computer-executable instructions that, in response to execution at a processor, cause the computer system to maintain the network interface as stable and operational during image file processing at the acceleration component. The network interface routes network traffic between the acceleration component and at least one other hardware component during image file processing at the acceleration component. The computer program product includes computer-executable instructions that, in response to execution at a processor, cause the computer system to utilize the role to participate in accelerating a service after configuration is complete.

The present described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope.

What is claimed:

1. A method for use at an acceleration component, the method for configuring the acceleration component, the method comprising:
    receiving an image file for configuring a network interface;
    processing the image file at the acceleration component to configure the acceleration component with the network interface;
    hardening the network interface so that acceleration component resources allocated for the network interface are not impacted by configuration of roles at the acceleration component, the allocated acceleration component resources including a plurality of logic blocks and at least one interconnect;
    receiving another image file from a computer system over a network through the network interface, the other image file sent by the computer system from a central image repository, the other image file including instructions for configuring the acceleration component with a role;
    another role at the acceleration component exchanging data with another networked component over the network through the network interface while the other image file from the central image repository is also being received through the network interface;
    configuring the acceleration component in accordance with the other image file by processing the instructions at the acceleration component to configure the acceleration component with the role;
    the other role at the acceleration component exchanging further data with the other networked component over the network through the network interface while the acceleration component is also being configured with the role during processing of the instructions; and
    utilizing the role to participate in accelerating a service after configuration of the role is complete.

2. The method of claim 1, further comprising maintaining one or more additional roles at the acceleration component as stable and operational during both:
    reception of the other image file through the network interface and configuring the acceleration component in accordance with the image file.

3. The method of claim 2, wherein maintaining one or more additional roles at the acceleration component as stable and operational comprises maintaining functionality provided to one or more groups of interoperating acceleration components composed together into graphs, the graphs providing acceleration for one or more other corresponding services.

4. The method of claim 2, wherein maintaining one or more additional roles at the acceleration component as stable and operational comprises:
   at least one of the one or more additional roles receiving some network traffic from another component via the network interface during both: reception of the image file through the network interface and configuring the acceleration component in accordance with the image file; and
   at least one of the one or more additional roles sending other network traffic to a further component via the network interface during both: reception of the image file through the network interface and configuring the acceleration component in accordance with the image file.

5. The method of claim 1, further comprising detecting a reason for changing the configuration of the acceleration component prior to receiving the other image file.

6. The method of claim 5, wherein detecting a reason for changing the configuration of the acceleration component comprises one of: detecting an error at the acceleration component, detecting an error at another acceleration component, detecting a changed demand for services, and determining that an update is available for the acceleration component.

7. The method of claim 5, wherein configuring the acceleration component in accordance with the other image file comprises configuring the acceleration component to address the detected reason.

8. The method of claim 1, wherein receiving the other image file comprises receiving the other image file over the network through the network interface in response to a request from a host component to the central repository, the host component locally linked to the acceleration component.

9. The method of claim 1, further comprising validating that the other image file was received from a legitimate network source prior to configuring the acceleration component in accordance with the other image file.

10. The method of claim 1, wherein the acceleration component comprises a Field Programmable Gate Array (FPGA).

11. The method of claim 1, wherein utilizing the role to participate in accelerating a service comprises using the role to participate accelerating a service, the service selected from among: document ranking, data encryption, data compression, speech translation, or computer vision.

12. The method of claim 1, further comprising:
   maintaining the network interface as stable and operational during both: reception of the other image file through the network interface and configuring the acceleration component in accordance with the other image file.

13. A computer program product for use at a hardware accelerator, the computer program product for implementing a method for configuring the hardware accelerator, the computer program product comprising one or more computer storage devices having stored thereon computer-executable instructions that, in response to execution at a processor, cause the method to be performed, including the following:
   receive an image file for configuring a network interface;
   processing the image file at the hardware accelerator to configure the hardware accelerator with the network interface;
   hardening the network interface so that hardware accelerator resources allocated for the network interface are not impacted by configuration of roles at the hardware accelerator, the allocated hardware accelerator resources including a plurality of logic blocks and at least one interconnect;
   receive another image file from a computer system over the network through the network interface, the other image file sent by the computer system from a central repository, the other image file for configuring the hardware accelerator with a role;
   another role at the hardware accelerator exchanging data with another networked component over the network through the network interface while the other image file from the central image repository is also being received through the network interface;
   configure the hardware accelerator in accordance with the other image file by processing the other image file at the hardware accelerator to configure the hardware accelerator with the role;
   the other role at the hardware accelerator exchanging further data with the other networked component over the network through the network interface while the acceleration component is also being configured with the role during processing of the instructions; and
   utilize the role to participate in accelerating a service after configuration of the role is complete.

14. The computer program product of claim 13, further comprising computer-executable instructions that, in response to execution, cause the computer system to maintain one or more roles at the hardware accelerator as stable and operational during both: reception of the image file through the network interface and configuring the hardware accelerator in accordance with the other image file.

15. The computer program product of claim 13, wherein computer-executable instructions that, in response to execution, cause the computer system to utilize the role to participate in accelerating a service comprise computer-executable instructions that, in response to execution, cause the computer system to use the role to acceleration a service, the service selected from among: document ranking, data encryption, data compression, speech translation, and computer vision.

16. The computer program product of claim 13, wherein computer-executable instructions that, in response to execution, cause the computer system to configure the hardware accelerator in accordance with the other image file comprises configuring the acceleration component without interrupting a locally linked host component.

17. An acceleration component, the acceleration component including:
   a processor configured into the acceleration component;
   a role configured into the acceleration component;
   system memory coupled to the processor, the system memory storing instructions that are executable by the processor; and
   the processor executing the instructions stored in the system memory to configure the acceleration component, including the following:

receive an image file for configuring a network interface;
process the image file at the acceleration component to configure the acceleration component with the network interface;
harden the network interface so that acceleration component resources allocated for the network interface are not impacted by configuration of roles at the acceleration component, the allocated acceleration component resources including a plurality of logic blocks and at least one interconnect;
receive another image file from a computer system over the network through the network interface, the other image file sent by the computer system from a central repository, the other image file including instructions for configuring the acceleration component with another role;
the role exchanging data with another networked component over the network through the network interface while the other image file from the central image repository is also being received through the network interface;
configure the acceleration component in accordance with the other image file by processing the instructions at the acceleration component to configure the acceleration component with the other role;
the role at the hardware accelerator exchanging further data with the other networked component over the network through the network interface while the acceleration component is also being configured with the other role during processing of the instructions; and
utilizing the other role to participate in accelerating a service after configuration of the other role is complete.

18. The system of claim 17, further comprising the processor executing the instructions stored in the system memory to maintain one or more additional roles at the acceleration component as stable and operational during both: reception of the other image file through the network interface and configuring the acceleration component in accordance with the image file.

19. The method of claim 1, wherein the acceleration component comprises one of: a Graphics Processing Unit (GPU), an Application Specific Integrated Circuits (ASIC), an Erasable programmable logic device (PLD), a Complex programmable logic device (PLD), an Array Logic (PAL) device, a Generic Array Logic (GAL) device, or a massively parallel processor array (MPPA) device.

20. The system of claim 17, wherein the acceleration component comprises one of: a Field Programmable Gate Array (FPGA), a Graphics Processing Unit (GPU), an Application Specific Integrated Circuits (ASIC), an Erasable programmable logic device (PLD), a Complex programmable logic device (PLD), an Array Logic (PAL) device, a Generic Array Logic (GAL) device, or a massively parallel processor array (MPPA) device.

* * * * *